United States Patent
Ikeda

(10) Patent No.: US 8,322,615 B2
(45) Date of Patent: Dec. 4, 2012

(54) INFORMATION READING APPARATUS

(75) Inventor: Masahiro Ikeda, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/417,570

(22) Filed: Mar. 12, 2012

(65) Prior Publication Data

US 2012/0205447 A1 Aug. 16, 2012

Related U.S. Application Data

(62) Division of application No. 11/885,102, filed as application No. PCT/JP2006/303495 on Feb. 24, 2006, now Pat. No. 8,157,171.

(30) Foreign Application Priority Data

| Feb. 10, 2005 | (JP) | 2005-326138 |
| Feb. 25, 2005 | (JP) | 2005-051062 |
| Feb. 20, 2006 | (JP) | 2006-042451 |

(51) Int. Cl.
G06K 17/00 (2006.01)

(52) U.S. Cl. ...................... 235/440; 235/454

(58) Field of Classification Search .................. 235/485, 235/380, 475
See application file for complete search history.

(56) References Cited

U.S. PATENT DOCUMENTS

| 4,775,785 A * | 10/1988 | Nakahara et al. ............. 235/449 |
| 5,488,371 A * | 1/1996 | Targove ............................ 342/1 |
| 2003/0163696 A1* | 8/2003 | Rancien ........................ 713/170 |

FOREIGN PATENT DOCUMENTS

| JP | 08-055250 | 2/1996 |
| JP | 11-345295 | 12/1999 |
| JP | 2002-049888 | 2/2002 |
| JP | 2002-304600 | 10/2002 |
| JP | 2003-168069 | 6/2003 |
| JP | 2003-242447 | 8/2003 |
| JP | 2003-283367 | 10/2003 |
| JP | 2004-213253 | 7/2004 |
| JP | 2005-354661 | 12/2005 |

OTHER PUBLICATIONS

International Search Report (PCT/ISA/210) dated May 30, 2006; (PCT/JP2006/303495 ).
Reader/Writer [Rida raita]; Kazunori Morikawa; Omron Co., Ltd; Japan.

* cited by examiner

*Primary Examiner* — Kristy A Haupt
(74) *Attorney, Agent, or Firm* — Frommer Lawrence & Haug LLP

(57) ABSTRACT

An information reading apparatus includes: a transfer path for transferring an information recording medium (a passport); an image sensor which is placed in a frame constructing the transfer path and optically reads information recorded in the information recording medium (the passport); and non-contact communication antennas which send and receive information to/from an antenna or an antenna embedded in the information recording medium (the passport), through electromagnetic induction. The plurality of non-contact communication antennas are laid out in the frame constructing the transfer path.

7 Claims, 18 Drawing Sheets (a)

(b)

(a)

(b)

(a)

(b)

(a)  (b)

(a)

(b)

(a)

(b)

us 8,322,615 B2

INFORMATION READING APPARATUS

This application is a divisional of U.S. patent application Ser. No. 11/885,102, filed Apr. 4, 2008, now U.S.Pat.No.8, 157,171 which claims priority from International Application No. PCT/JP2006/303495, filed Feb. 24, 2006, which claims priority from Japanese Application No. 2005-051062, filed Feb. 25, 2005, Japanese Application No. 2005-326138, filed Nov. 10, 2005, and Japanese Application No. 2006-042451, filed Feb. 20, 2006, the disclosures of which are incorporated herein by reference in their entirety.

BACKGROUND OF THE INVENTION a) Field of the Invention

The present invention relates to an information reading. apparatus for reading information (electronic information, optical information, and so on) recorded on an information recording medium made of paper, a plastic material, and so forth.

b) Description of the Related Art

There exist conventionally-used information recording media including a license card, an automatic teller card, a credit card, a passport, and so forth, on which personal data is recorded. In order to record personal data onto an information recording medium, used sometimes are images such as a barcode, a two-dimensional barcode, an OCR (Optical Character Recognition) character, etc., and visual characteristics such as a facial portrait, a fingerprint, a signature, and so on. In addition, electromagnetic and electronic clement devices such as an electromagnetic stripe, a contact IC chip, a non-contact IC chip are also sometimes used.

In the meantime, as a method for optically reading an image such as a barcode, a facial portrait, and so forth on an information recording medium, there is a reading method in which a scanner (e.g., a swipe-type scanner) equipped with, for example, a linear image sensor, a two-dimensional sensor, etc., is used (for example, refer to Patent Document 1 listed below). Incidentally, "Swipe" means an operation of manually moving an information recording medium quickly along a transfer path of an information reading apparatus.

Furthermore, as a method for reproducing information recorded in a non-contact IC chip in an information recording medium through wireless communication as well as recording information into a non-contact IC chip through wireless communication, there is a reproducing and recording method using a reader-writer equipped with, for example, a non-contact communication antenna of an RF frequency range, a UHF frequency range, a microwave frequency range, etc. (for example, refer to Patent Document 2 listed below). Reading information recorded in such an information recording medium is unaffected by a blot, abrasion, etc., on the information recording medium, and therefore accuracy to be obtained in this case is higher than accuracy in a case of optically reading information recorded in a two-dimensional barcode. As a non-contact IC chip, there are various kinds including a card type, a button type, and so on. In this case, an RF (Radio Frequency) IC chip is generally assumed as a non-contact IC chip. Furthermore, as an antenna for recording and reproducing data into/from the RF IC chip, an RF communication frequency range antenna is taken as an example.

Moreover, for an information recording medium on which the two-dimensional barcode and the facial portrait described above are printed and in which an IC chip and an antenna coil are embedded; beginning to spread is a hybrid type information reading apparatus equipped with both the functions of optically reading the barcode and the facial portrait as well as recording and reproducing data into/from the IC chip through non-contact communication (for example, refer again to Patent Document 1). In the hybrid type information reading apparatus, such a close coupling CCD image sensor described above and the RF communication frequency range antenna described above are placed in proximity to each other according to a request of a downsized design of recent years. Then, there is a tendency that an image processing circuit for processing image data captured by the close coupling CCD image sensor and a detecting circuit for processing non-contact communication data obtained by the RF communication frequency range antenna are also placed together in a narrow area according to a request of a downsized design of recent years.

Furthermore, in recent years, as an application of the information recording medium described above, an electronic passport in which a non-contact IC chip (for example, an RFIC) is embedded is going to be standardized internationally. According to the international standard, which is still under investigation though, it is requested to follow a series of sequential steps for sending and receiving information to/from the electronic passport (hereinafter, to be simply called "passport" as well). More specifically, an OCR character printed on the passport is read at first in advance of communication with the non-contact IC chip in the passport. Then, afterward according to a result of reading the OCR character, a key for access to the non-contact IC chip (an access key) is created so that it is allowed through obtainment of the key to communicate with the non-contact IC chip.

Thus, in order to send and receive information to/from the passport in which the non-contact IC chip is embedded, not only an non-contact communication antenna for communication with the non-contact IC chip but also an image sensor for reading the OCR character are necessary. Therefore, at present, two interface cables are drawn out of an upper device such as a PC (a host), and the image sensor for reading the OCR character is connected to one of the two cables, while a reader-writer having only one non-contact communication antenna is connected to the other of the two cables.

Patent Document 1: Japanese Unexamined Patent Publication (Kokai) No. 2003-168069 (FIG. 1)

Patent Document 2: Japanese Unexamined Patent Publication (Kokai) No. 2005-354661 (FIG. 10)

Patent Document 3: Japanese Unexamined Patent Publication (Kokai) No. 2004-213253 (FIG. 1 & FIG. 3)

SUMMARY OF THE INVENTION

However, in a case where the image sensor for reading the OCR character, etc. and the reader-writer having the communication antenna exist independently, required are two operations; namely, reading the OCR character (for example, operation of swiping a passport, etc. as an information recording medium with a swiping-type scanner) and communication with the non-contact IC chip (operation of holding up the passport, etc. to the reader-writer). As a result, there exists a problem that the operability is poor. Especially for people who are not used to operating such an image sensor and a reader-writer, the independent two operations are awkward and complicated so that there is a chance that those operation steps cannot be carried out smoothly.

According to the international standard described above, a medium side antenna for the non-contact IC chip is embedded in either a backside of a back cover or a first page after the back cover of a passport booklet is opened. However, condition of a location of the medium side antenna is usually different country by country. Therefore, in order to carry out the operation steps smoothly, it is necessary to know beforehand at which location the medium side antenna is embedded; namely, as described above, either the backside of the back cover or the first page after the back cover is opened. In terms of this point, there is a lack of convenience and a deficiency of operability.

Furthermore, when the above operation steps are carried out by using a swiping-type information reading apparatus, information is read while an end of the information recording medium is held by hand and swiping is put into practice. Therefore, at the time, the information recording medium moves along a transfer path. Meanwhile, in a case of an information recording medium like the electronic passport in which the non-contact IC chip and the antenna coil are embedded, especially such as a medium having a great amount of data of personal biological information including a facial image, a fingerprint; a communication speed for sending and receiving information based on an electromagnetic interaction is relatively slow in comparison with the moving speed. Accordingly, for implementation of appropriate communication, it is needed to make the information recording medium temporarily stop. Thus, when the swiping-type information reading apparatus reads information recorded in a hybrid-type information recording medium in which a two-dimensional barcode is printed and the non-contact IC chip as well as the antenna coil are embedded, two kinds of motions being contradictory each other; namely "Move" and "Temporary stop", are required.

From this viewpoint, it is also considered that, for example, a first swiping operation is carried out so as to keep the information recording medium moving on for optically reading the information recorded in the two-dimensional barcode, and then a second swiping operation is carried out to temporarily stop the information recording medium for sending and receiving the information to/from the non-contact IC chip. However, there is a problem that such a method requires two operations so that the operability gets deteriorated.

In the meantime, it is also considered that, for example, the information recording medium is moved down halfway to optically read the information recorded in the two-dimensional barcode; and when the information recording medium reaches a position inside the transfer path for facing the antenna, the information recording medium gets temporarily stopped for sending and receiving the information to/from the non-contact IC chip. Through such a method, one-time swiping operation including a temporary stop makes it possible to read the information. However, since an operation of swiping the information recording medium is an action done by a human operator, it is also possible that the operator may become so conscious of a need of the temporary stop as to slow down a transfer speed or cause a temporary stop by mistake before reading the information recorded in the two-dimensional barcode. Eventually, there is a problem that an accuracy of reading the two-dimensional barcode gets deteriorated due to a change of the transfer speed at the time of reading the information recorded in the two-dimensional barcode, and it is difficult to temporarily stop the information recording medium every time at the specified position inside the transfer path.

Furthermore, when a close coupling CCD image sensor for reading an OCR character, etc. and an image processing circuit as well as an RF frequency range antenna (a non-contact communication antenna) and a detecting circuit are used together in the swiping-type information reading apparatus described above for sending and reading information, oscillators are placed on a substrate in proximity to each other side by side. Then, frequencies, which are divided by the oscillators, include a clock frequency (48 MHz) to be transferred to the close coupling CCD image sensor and the image processing circuit, as well as a carrier frequency (for example, 13.56 MHz: specified by ISO standard) of non-contact communication data obtained by the RF frequency range antenna. Then these two frequencies are relatively close to each other in terms of a logarithm order) so that a noise, caused by an electromagnetic wave radiated from the RF frequency range antenna, enters the close coupling CCD image sensor, wiring inside the image processing circuit, and so on (namely, crosstalking happens electromagnetically). As a result, there is a problem that when the close coupling CCD image sensor for reading the OCR character, etc. and the image processing circuit as well as the RE frequency range antenna and the detecting circuit are located together in a narrow area in the swiping-type information reading apparatus described above, a beat noise due to an electromagnetic interaction is generated which deteriorates image quality and communication quality of the information reading apparatus as a whole.

The present invention has been created and developed in view of the problems described above, and an object of the present invention is to provide an information reading apparatus that can read information of a hybrid-type information recording medium, on whose surface image information including visual characteristics such as a barcode, an OCR character, a facial portrait, a fingerprint, a signature, and so on is recorded, and furthermore in which a non-contact IC chip and an antenna coil are embedded and then electromagnetic information such as personal information data and so forth is saved in the non-contact IC chip. The object of the present invention is especially to provide an information reading apparatus with which it is possible to carry out a process of reading an image of an image sensor and so on, as well as a process of a non-contact communication antenna through one-time transfer operation (a swiping operation) and operability can be improved. Furthermore, the object of the present invention is to provide an information reading apparatus with which it is possible to prevent a beat noise from occurring due to an electromagnetic interaction when reading information recorded in an information recording medium (or writing such information into an information recording medium) is carried out by using the information reading-apparatus in which different data such as image data captured by an image sensor, wireless communication data obtained by a non-contact communication antenna, etc. is processed by each different circuit.

To solve the problems identified above, the present invention provides the following contents:

(1) An information reading apparatus including: a transfer path for transferring an information recording medium; an image sensor which is placed so as to face the transfer path and optically reads information recorded in the information recording medium; and a non-contact communication antenna which sends and receives information to/from an antenna embedded in the information recording medium through electromagnetic induction; wherein the non-contact communication antenna is provided in plural numbers, and the non-contact communication antennas are laid out in an extended part of the transfer path.

According to the present invention, in the information reading apparatus including the transfer path, the image sensor, and the non-contact communication antennas (for example, an RF antenna and so on), the plurality of non-contact communication antennas are laid out in an extended part of the transfer path so that convenience performance and operability can be improved.

That is to say, at the time when the information recording medium is transferred through the transfer path, the image sensor carries out reading operation of an OCR character and the non-contact communication antennas (of the information reading apparatus) carry out communicating operation with a non-contact IC chip (of the information recording medium), so that one-time transfer operation puts a desired process into practice. Therefore, operability can be improved. Especially even for people who are not accustomed to operating the information reading apparatus, it is not required to carry out two operations, which were needed conventionally, and just one-time transfer operation of the information recording medium is sufficient. Accordingly, various procedures can be carried out smoothly, and then convenience performance and operability can be improved.

Furthermore, since the plurality of non-contact communication antennas are laid out in the extended part of the transfer path, sending and receiving information can be done by using one of the non-contact communication antennas, even though it is not known where an antenna for the non-contact IC chip at the medium side is embedded. Eventually, the number of errors can be reduced so as to contribute to further improvement of operability.

In the meantime, for transferring the information recording medium along the transfer path, the information recording medium may be transferred by swiping manually or may be transferred automatically by using a transfer roller and so on. Moreover, although the non-contact communication antennas are "provided in plural numbers," there is no restriction to the number and positions of the non-contact communication antennas. That is to say; as far as it is possible to send and receive information by using any of the plurality of non-contact communication antennas, the number and positions of the non-contact communication antennas do not matter. Furthermore, a function of "the information reading apparatus" explained in this specification document may include not only a function of reading (reproducing) information recorded in the information recording medium but also a function of writing (recording) information into the information recording medium. Incidentally, it is simply required in the present invention that the non-contact communication antennas are laid out in "the extended part" of the transfer path, and therefore the image sensor and the non-contact communication antennas may be placed, for example, in the same frame or may be placed in different frames separately and independently as well.

(2) The information reading apparatus according to item (1) above, wherein each of any two of the non-contact communication antennas is placed on each of planes that are almost perpendicular to each other.

According to the present invention, each of any two of the non-contact communication antennas described above is placed on each of planes that are almost perpendicular to each other. Therefore, in addition to the operability described above, workability can also be improved.

That is to say, in a case of a conventional reader-writer, it is required to open a booklet-like information recording medium such as a passport and so on, and to press the booklet-like information recording medium against a communication surface and keep on holding the booklet-like information recording medium, for example, for about 3 to 10 seconds by hand until communication with the non-contact IC chip (of the booklet-like information recording medium) finishes. It is because if the booklet-like information recording medium is released from the hand, a middle part of the booklet-like information recording medium rises due to closing force of the booklet-like information recording medium so that the booklet-like information recording medium and the non-contact communication antenna get separated from each other. Therefore, while the booklet-like information recording medium is held up to the reader-writer, no other work can be done by using both hands even if tried, and therefore workability is not good.

However, according to the present invention, at the time when communication with the non-contact IC chip is carried out, the booklet-like information recording medium such as a passport and so on is made to be in an L-shaped condition (i.e., being bent inward for about 90 degrees) so that the booklet-like information recording medium and the non-contact communication antenna get scarcely separated from each other and the communication with the non-contact IC chip (of the booklet-like information recording medium) is carried out adequately. Accordingly, in a case of the information reading apparatus relating to the present invention, other work can be carried out by using both hands during the communication with the non-contact IC chip, and eventually workability can be improved.

(3) The information reading apparatus according to one of item (1) and item (2): wherein a transfer basis surface is formed in the transfer path and the extended part, and information is sent and received by swiping the information recording medium along the transfer basis surface; and the image sensor and the non-contact communication antennas are placed in due order in a direction along which the information recording medium is swiped.

According to the present invention, in the swiping-type information reading apparatus, the image sensor and the non-contact communication antennas are placed in due order in the direction along which the information recording medium is swiped. Accordingly, in a case of an electronic passport for example, sending and receiving information to/from the passport can be carried out appropriately by following a series of sequential steps specified in the international standard described above.

To describe more in detail, when the passport is swiped along the transfer basis surface, the passport is transferred at first to a position facing the image sensor. And when an OCR character printed on the passport is read, a key for communication with the non-contact IC chip embedded in the passport is simultaneously created. Subsequently, when the passport is transferred to a position facing the non-contact communication antenna, communication with the non-contact IC chip gets started appropriately by using the created key. Thus, the series of sequential steps described above can be implemented by one-time swiping operation.

(4) The information reading apparatus according to item (3): wherein the transfer path is formed in a frame including a first frame section, a second frame section, and a third frame section; the first frame section, in which the non-contact communication antennas are placed, is formed so as to have its depth down to the transfer basis surface deeper than the second frame section, in which the image sensor is placed; and the first frame section and the second frame section are made to be continuous by the third frame section which is formed with at least one of a round shape part and a chamfered part.

According to the present invention, in the comparison of the first frame section in which the non-contact communication antennas are placed, and the second frame section in which the image sensor is placed; the first frame section is formed so as to have its depth down to the transfer basis surface deeper than the second frame section. Then, both frame sections are made to be continuous by the third frame section which is formed with at least one of a round shape part and a chamfered part. Therefore, even if a booklet-like information recording medium such as a passport is half-open, for example, at the second frame section in a condition of being folded inward for an angle less than 90 degrees), the booklet-like information recording medium (passport) gets opened by itself without being hooked halfway since the third frame section is formed with at least one of a round shape part and a chamfered part. Accordingly, the booklet-like information recording medium is smoothly guided to the first frame section, and consequently operability can be improved.

(5) The information reading apparatus according to item (4): wherein the second frame section includes a pressing member that presses the information recording medium in a direction perpendicular to a transfer direction.

According to the present invention, the second frame section described above includes the pressing member that presses the information recording medium in a direction perpendicular to a transfer direction, and therefore it is possible to avoid an error that may be caused by displacement of the information recording medium at the time of communication with the non-contact IC chip, and consequently reliability of the information reading apparatus can be enhanced. Furthermore, the pressing member prevents the booklet-like information recording medium (passport) and the non-contact communication antenna from getting separated from each other for sure, and therefore other work can be done further, at ease, during communication with the non-contact IC chip.

(6) The information reading apparatus according to any of item (1) through item (5): wherein the information reading apparatus still further includes a means for looking up a non-contact communication antenna, with which communication can be done, among the plurality of non-contact communication antennas.

According to the present invention, the information reading apparatus described above includes the means for looking up a non-contact communication antenna, with which communication can be done, among the plurality of non-contact communication antennas. Therefore, even if a user does not know a position where the medium side antenna for the non-contact IC chip is embedded (for example, embedded in either a backside of a back cover or a first page after the back cover opened of a passport booklet) or the user does not know which one of the plurality of non-contact communication antennas shall be selected even knowing the position of the medium side antenna for the non-contact IC chip, communication with the non-contact IC chip can be implemented without taking care of the above problems so as to consequently contribute to improvement of operability.

(7) The information reading apparatus according to item (6): wherein the means for looking up includes a multiplexer; and a non-contact communication antenna, with which communication can be done, is looked up by carrying out an activating operation of the non-contact communication antennas every time when the switching operation is implemented by the multiplexer.

According to the present invention, the means for looking up includes the multiplexer, and a non-contact communication antenna, with which communication can be done, is looked up by implementation of an activating operation of the non-contact communication antennas every time when the switching operation is implemented by the multiplexer. Therefore, a non-contact communication antenna, with which communication can be done, can be looked up easily and quickly.

(8) The information reading apparatus according to item (6): wherein the look-up means looks up a non-contact communication antenna, with which communication can be done, by monitoring a presence of a response from a side of the information recording medium with AM detection.

According to the present invention, a non-contact communication antenna, with which communication can be done, is looked up by monitoring a presence of a response (modulation) from a side of the information recording medium with AM detection. As a result, a presence of an activating operation can be detected with a presence of a signal modulation from a side of the information reading apparatus, and consequently the time until the activating operation is shortened so as to materialize an information reading apparatus provided with a higher communication speed.

(9) The information reading apparatus according to item (6): wherein the look-up means looks up a non-contact communication antenna, with which communication can be done, by monitoring a change in load of the non-contact communication antennas.

According to the present invention, a non-contact communication antenna, with which communication can be done, is looked up by monitoring a change in load of the non-contact communication antennas. Therefore, in the same manner as described above, the presence of an activating operation can be detected with a presence of a signal modulation from a side of the information recording medium, and consequently the time until the activating operation is shortened so as to materialize an information reading apparatus provided with a higher communication speed.

(10) The information reading apparatus according to any of item (1) through item (9): wherein the information reading apparatus carries out sending and receiving information to/from an upper system through a single interface.

According to the present invention, in the information reading apparatus described above, sending and receiving information to/from an upper system is carried out through a single interface. That is to say, one-wire communication is carried out, and accordingly there is no chance of a plurality of wires getting entangled so that functionality can be improved.

(11) An information reading apparatus including: a transfer path for transferring an information recording medium; wherein the transfer path has a restricting member that controls passage of the information recording medium.

According to the present invention, in the information reading apparatus, a restricting member that controls passage of the information recording medium is placed in the transfer path for transferring the information recording medium made of paper, plastics, and so on. Therefore, the information recording medium, being transferred through the transfer path, can easily be stopped at a desired position.

Accordingly, for example in a swiping-type information reading apparatus, it becomes easy to temporarily stop the information recording medium while swiping the information recording medium. Therefore, by one-time swiping operation, information recorded in a two-dimensional barcode, a facial portrait, and so on can be read optically, and moreover sending and receiving information to/from a non-contact IC chip (for example, an RFIC chip) can be carried out. Thus, according to the present invention, one-time swiping operation makes it possible to read information so that workability can be improved in comparison with a conventional information reading apparatus.

Furthermore, in the present invention, temporarily stopping the information recording medium during the swiping operation is carried out not by man-caused operation but by using the restricting member that restricts passage of the information recording medium. Therefore, it is not requested for a user of the information reading apparatus to care about a need of "stopping at a predefined position during a swiping operation". As a result, it is possible to avoid changing a transfer speed of the information recording medium at an unnecessary position, for example, before the information recorded in the two-dimensional barcode is fully read optically. Consequently, it is possible to prevent reading accuracy for the two-dimensional barcode from deterioration.

Moreover, as described above, since it is not requested for the user of the information reading apparatus to care about a need of "stopping at a predefined position during a swiping operation", workability is improved and operation errors lessen. In addition, even an optically-challenged user can easily position the information recording medium by making use of the restricting member without visually checking the swiping operation by the user. Therefore, an additional value as welfare equipment for optically-challenged people can be recognized.

Incidentally, according to the present invention, even if the user releases the information recording medium from a hand, the restricting member holds the information recording medium so that the user can carry out other work under the condition.

In the meantime, "the restricting member" may be any component as far as the component restricts passage of the information recording medium (temporarily or permanently). For example, the restricting member may be any component made of silicon rubber, natural rubber, fluorine-base resins, wood, or a steel plate of aluminum, stainless steel, and so on.

Still further, the information reading apparatus may be not only a swiping-type information reading apparatus, but also a dip-type information reading apparatus or a motor-type information reading apparatus. By the way, "a dip-type information reading apparatus" is a device in which a card (information recording medium) is manually inserted into and/or pulled out of a slit-shaped insertion slot placed in a sectional part of the transfer path, and meanwhile "a motor-type information reading apparatus" is a device in which a card, inserted through an insertion slot into the information reading apparatus, is transferred while being held by a motor-driven pad roller and so on.

(12) The information reading apparatus according to item (11): wherein the restricting member is a movable restricting member that moves in a direction almost perpendicular to a transfer direction of the information recording medium.

According to the present invention, the restricting member described above is a movable restricting member that moves in a direction almost perpendicular to a transfer direction of the information recording medium. Therefore, the restricting member placed in the transfer path can be removed easily, and consequently operability can be improved. That is to say, in a case where sending and receiving information to/from a non-contact IC chip (for example, an RFIC chip) is not required, the restricting member placed in the transfer path is moved in a direction almost perpendicular to a transfer direction of the information recording medium so as to be located outside the transfer path, and then it becomes easy to carry out swiping operation. On the other hand, for example, in a case where a downsized design even with two-time operation is required at the cost of good workability of one-time operation for sending and receiving information with the RFIC and optically reading a two-dimensional barcode, a facial portrait, etc.; the restricting member can be shunted at the time of optically reading data and furthermore it becomes easy by placing the restricting member to position the information recording medium for sending and receiving information with the RFIC. As a result, operability and functionality can be improved.

Moreover, in a case of a non-contact IC chip that does not include a large volume of data like a facial image and fingerprint data, sending and receiving information can be finished while the image sensor is reading an image and simultaneously the media is moving. Therefore, in such a case, the restricting member is unnecessary so that the restricting member can be removed beforehand from the transfer path. As a result, operability can be improved.

(13) The information reading apparatus according to item (12): wherein the movable restricting member is a lever having a prescribed shape that protrudes into the transfer path.

According to the present invention, the movable restricting member described above is a lever having a prescribed shape (for example, L-shaped, Z-shaped, or being shaped like a pin, etc.) that protrudes into the transfer path, therefore it can be controlled easily whether the restricting member protrudes into the transfer path or gets pulled back into the frame constructing the transfer path. Consequently, operability can be improved easily.

(14) The information reading apparatus according to one of item (12) and item (13): wherein the movable restricting member is moved by an actuator.

According to the present invention, the movable restricting member described above is moved by an actuator such as a solenoid, therefore the restricting member can be moved automatically so that consequently operability can further be improved. For example, an arrangement is made in such a manner that; the information recording medium is swiped in the transfer path, and when an end of the information recording medium bumps against the movable restricting member, having spent one second from the moment of bumping, the restricting member gets pulled back automatically into the frame. Thus, even without man-caused operation such as pressing a button, etc. for the L-shaped lever described above, reading information can be implemented smoothly.

(15) The information reading apparatus according to item (13): wherein the lever having a prescribed shape is connected to a button.

According to the present invention, the lever having a prescribed shape is connected to a button, and therefore the lever, having the prescribed shape and being placed in the transfer path, can be removed easily with a simple structure. As a result, operability and functionality can be improved.

(16) The information reading apparatus according to item (15): wherein the lever having a prescribed shape is moved by using the button.

According to the present invention, the lever having a prescribed shape is moved by using the button described above, and therefore a simple operation such as pressing the button makes it possible to move the lever, having the prescribed shape and being placed in the transfer path. As a result, operability and functionality can be improved.

(17) An information reading apparatus including: a transfer path for transferring an information recording medium; an image sensor which is placed in the frame constructing the transfer path, and optically reads information recorded in the information recording medium; and a non-contact communication antenna which is placed in the frame constructing the transfer path, and sends and receives information to/from an antenna coil embedded in the information recording medium through electromagnetic induction; wherein the non-contact communication antenna is laid out in proximity to the image sensor.

According to the present invention, the information reading apparatus includes: the transfer path, the image sensor which is placed in the frame, the non-contact communication antenna (for example, an RF antenna) which sends and receives information to/from an antenna coil embedded in the information recording medium through electromagnetic induction. Then, since the non-contact communication antenna is laid out in proximity to the image sensor, a downsized design of the information reading apparatus is materialized and furthermore one-time swiping operation makes it possible to optically read information recorded in a two-dimensional barcode, a facial portrait, and so on, as well as to send and receive information to/from a non-contact IC chip (for example, an RFIC chip). Incidentally, "in proximity to" in this case means a distance within which an electromagnetic wave from the non-contact communication antenna affects operation of the image sensor.

(18) The information reading apparatus according to item (17): wherein the non-contact communication antenna is laid out next to the image sensor.

According to the present invention, the non-contact communication antenna described above (for example, an RF antenna) is laid out next to the image sensor. Therefore, if an arrangement is so made that the information recording medium bumps against the restricting member described above after a part of the information recording medium to be read as an image passes the image sensor in the swiping operation, the information reading apparatus becomes compact and operation can be finished by one-time swiping operation.

(19) The information reading apparatus according to item (17): wherein the non-contact communication antenna is placed so as to surround the image sensor.

According to the present invention, the non-contact communication antenna described above (for example, an RF antenna) is placed so as to surround the image sensor. Therefore, regarding the length of the information reading apparatus, i.e., a transferring distance of the information recording medium; the length can be so short enough as length of a side line of a rectangular which the non-contact communication antenna forms, and consequently it is possible for the information reading apparatus to materialize a downsized and compact design which a conventional information reading apparatus cannot do.

(20) The information reading apparatus according to any of item (17) through item (19): wherein the image sensor is covered at least partially with an electromagnetic shielding member.

According to the present invention, the image sensor describe above is covered at least partially with an electromagnetic shielding member. Therefore, even though an electromagnetic wave radiated from the non-contact communication antenna described above (for example, an RF antenna) hits the image sensor, a bad influence upon operation of the image sensor (for example, a noise coming up on an optical image) can be minimized. Incidentally, "electromagnetic shielding" described above includes both "electric shielding (electrolysis shielding)" and "magnetic shielding". Then, taking into account whether the image sensor is likely to get affected by electric influence or magnetic influence, one of the two can be selected for implementation. Furthermore, the "electromagnetic shielding member" can be any component as far as the component can reduce or reflect an electromagnetic wave; and for example, a metal foil such as an aluminum foil, a copper foil, and so on can be used as the electromagnetic shielding member.

(21) An information processing apparatus for a data recording medium including: implementation of at least one of recording data and reproducing data for the data recording medium that includes first recording section for recording a first data and a second recording section for recording a second data; wherein a first data processing section for at least one of recording data and reproducing data for the first recording section and a second data processing section for at least one of recording data and reproducing data for the second recording section are placed in proximity to each other; and a phase of an electrical signal for operating the first data processing section and a phase of an electrical signal for operating the second data processing section are synchronized.

According to the present invention, in the information processing apparatus, placed in proximity to each of the first recording section and the second recording section of the data recording medium is each of the first data processing section and the second data processing section for at least one of recording data and reproducing data, respectively. Furthermore, since a phase of an electrical signal for operating the first data processing section and a phase of an electrical signal for operating the second data processing section are synchronized, a beat noise can be reduced.

That is to say, for example, even if an electromagnetic crosstalk occurs between the first data processing section and the second data processing section, what occurs is a stable noise (for example, a cyclic noise) since the phases of the electrical signals for operating the first data processing section and the second data processing section are synchronized. Then, the stable noise is removed more easily than an unstable noise (for example, a non-cyclic noise) is. As a result, it is possible to prevent a beat noise (e.g., "a buzz", etc.) by a phase shift of the oscillators from occurring due to an electric interaction and to prevent a beat noise from being generated due to leakage entering of a power supply system so as to avoid deterioration of image quality and communication quality.

On this occasion, what can be listed as "the first data" and "the second data" includes various data; for example, data recorded in an IC memory (an RFIC as a non-contact IC, and so on) which can be accessed by using wireless communication (RF, UHF, microwave, and Bluetooth), image data captured by the image sensor, and so on. Furthermore, magnetic data read by a magnetic head may also be included according to circumstances. Incidentally, "data" on this occasion includes various kinds of information to be exchanged between the information recording medium and the information processing apparatus.

Furthermore, "the electrical signals" for operating the first data processing section and the second data processing section include, for example, a carrier wave in wireless communication, a transfer clock for image data, a transfer clock for magnetic data, and so on. Furthermore a type of an electrical signal to be used does not matter, as far as the electrical signal can operate a process required for recording and reproducing data to/from the first recording section and the second recording section.

Moreover, "being synchronized" means that at least a phase difference is almost constant. For example, a phase difference between the electrical signal for operating the first data processing section and the electrical signal for operating the second data processing section may be 0, a certain constant value, or a cyclic value accompanied by somewhat fluctuation. Thus, in the present invention, since the phase difference between the electrical signals is 0 or almost constant, it is possible to prevent a beat noise, which is unstable and cannot be removed easily in the first data processing section and the second data processing section, from occurring.

Incidentally, in the present invention, the number of oscillators for driving the first data processing section and the second data processing section may be one or two; and the number and the type of oscillators do not matter. Furthermore, "being placed in proximity" means that the first data processing section and the second data processing section are so placed as to have a distance between the two, with which operation of one of the two somewhat affects operation of the other.

(22) The information processing apparatus for a data recording medium according to item (21): wherein the information processing apparatus for a data recording medium further includes an oscillating section for driving the first data processing section and the second data processing section; and an electrical signal for operating the first data processing section and an electrical signal for operating the second data processing section are an electrical signal obtained by one of multiplication and division of a clock signal sent from the oscillating section.

According to the present invention, the information processing apparatus described above includes an oscillating section for driving the first data processing section and the second data processing section, and an electrical signal for operating the first data processing section and an electrical signal for operating the second data processing section are an electrical signal obtained by one of multiplication and division of a clock signal sent from the oscillating section. Therefore, a phase difference between the two electrical signals can easily be made to be 0 or almost constant with a simple electrical structure, so that it is easily possible to prevent a beat noise, which is unstable and cannot be removed easily in the first data processing section and the second data processing section, from occurring.

Incidentally, "one of multiplication and division" includes integral multiplication of the clock signal, multiplying the clock signal by (1/an integer), as well as multiplying the clock signal simply by one. That is to say, the electrical signal for operating the first data processing section and the electrical signal for operating the second data processing section may be the clock signal sent from the oscillating section as it is.

(23) The information processing apparatus for a data recording medium according to one of item (21) and item (22): wherein the first data processing section carries out at least one of recording data and reproducing data for the first recording section including a memory IC through wireless communication in non-contact condition.

According to the present invention, the first data processing section described above carries out at least one of recording data and reproducing data for the first recording section including a memory IC through wireless communication in non-contact condition. Therefore, even if a noise is generated in the second data processing section due to a signal (for example, a carrier wave) to be used by the first data processing section for wireless communication in non-contact condition, the noise becomes a stable one and the stable noise can be removed. Accordingly, reliability of data processing operation in the second data processing section can be enhanced.

(24) The information processing apparatus for a data recording medium according to item (23): wherein the second data processing section is an image sensor for reading and reproducing data of the second recording section, which records image data, by taking an image optically; and a phase of a carrier wave for operating the first data processing section and a phase of a transfer clock for operating the image sensor are synchronized.

According to the present invention, the second data processing section described above is an image sensor for reading and reproducing data of the second recording section, which records image data, by taking an image optically; and a phase of a carrier wave for operating the first data processing section and a phase of a transfer clock for operating the image sensor are synchronized. Therefore, even if a noise is generated in the second data processing section (an image sensor or an image processing circuit) due to a carrier wave to be used by the first data processing section for wireless communication in non-contact condition, the noise becomes a stable one. Accordingly, it is possible to remove the stable noise by implementation of black correction and/or white correction (shading correction) in progress of image processing operation.

(25) The information processing apparatus for a data recording medium according to any of item (21) through item (24): wherein the information processing apparatus for a data recording medium includes a frame that constructs a transfer path; a part of the frame is formed as a traveling basis surface; and at least one of recording data and reproducing data is carried out by swiping the data recording medium along the traveling basis surface.

According to the present invention, since the information processing apparatus described above is a so-called swiping-type information processing apparatus (for example, a card reader), the swiping-type information processing apparatus which brings various effects as described above can be provided, taking into consideration requests for a hybrid design concept and a compact design concept in recent years.

For example, in a case of a conventional swiping-type information processing apparatus, if once a noise generated in RF communication (non-contact IC communication) is placed on an image sensor or an image processing circuit, a beat noise that cannot be removed easily in the image processing circuit occurs. As a result, a reading error happens and a user needs to swipe the card again for another retrying operation. However, according to the present invention, even if a noise generated in RF communication is placed on the image sensor or the image processing circuit, what occurs is a stable noise that can be removed easily in the image processing circuit. As a result, the number of reading errors can lessen so that the number of retrying operations by the user is reduced and reliability of the information processing apparatus as a whole can be enhanced. Incidentally, "swipe" means an operation of manually moving a data recording medium quickly along a transfer path of the information processing apparatus.

(26) A method for processing information of a data recording medium comprising: at least one of recording data and reproducing data by using an information processing apparatus for the data recording medium, having a first recording section for recording a first data and a second recording section for recording a second data, which includes: a first data processing section for at least one of recording data and reproducing data for the first recording section; a second data processing section for at least one of recording data and reproducing data for the second recording section; and an oscillating section for driving the first data processing section and the second data processing section; further comprising: a first step which sends a clock signal from the oscillating section; a second step which carries out one of multiplication and division of the clock signal; and a third step which sends an electrical signal obtained through the second step to the first data processing section and the second data processing section.

According to the present invention, the method for processing information of a data recording medium comprises at least one of recording data and reproducing data for the data recording medium; and further comprises a step for sending a clock signal from the oscillating section; another step for carrying out one of multiplication and division of the clock signal; and still another step for sending an electrical signal obtained through one of multiplication and division to the first data processing section, which carries out at least one of recording data and reproducing data for the first recording section of the data recording medium, and the second data processing section, which carries out at least one of recording data and reproducing data for the second recording section of the data recording medium. As a result, it is possible to prevent a beat noise (e.g., "a buzz", etc.) by a phase shift of an oscillator from occurring due to an electric interaction and to prevent a beat noise from being generated due to leakage entering of a power supply system so as to avoid deterioration of image quality- and communication quality.

As explained above, according to the present invention, for a hybrid-type information recording medium, on whose surface image information including visual characteristics such as a barcode, an OCR character, a facial portrait, a fingerprint, a signature, and so on is recorded, and furthermore in which a non-contact IC chip and an antenna coil are embedded and then electromagnetic information such as personal information data and so forth is saved in the non-contact IC chip, it is possible to carry out a process of reading an image of an image sensor and so on, as well as a process of a non-contact communication antenna through one-time transfer operation (a swiping operation), and therefore operability can be improved. Furthermore, during communication between the non-contact IC chip of the information recording medium and the non-contact communication antenna of the information reading apparatus, other work can be carried out by using both hands so that workability can be improved.

Moreover, it is possible to prevent a beat noise from occurring due to an electromagnetic interaction when different data such as image data, wireless communication data, etc. is processed by each different circuit. Therefore, deterioration of image quality and communication quality can be avoided; and reliability, convenience performance, and operability in reading information can be improved.

DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

First Embodiment

A first embodiment (hereinafter, to be called "the embodiment No. 1") is described below with reference to FIG. 1 through FIG. 4, as a preferred embodiment of the present invention.

Figure 1:
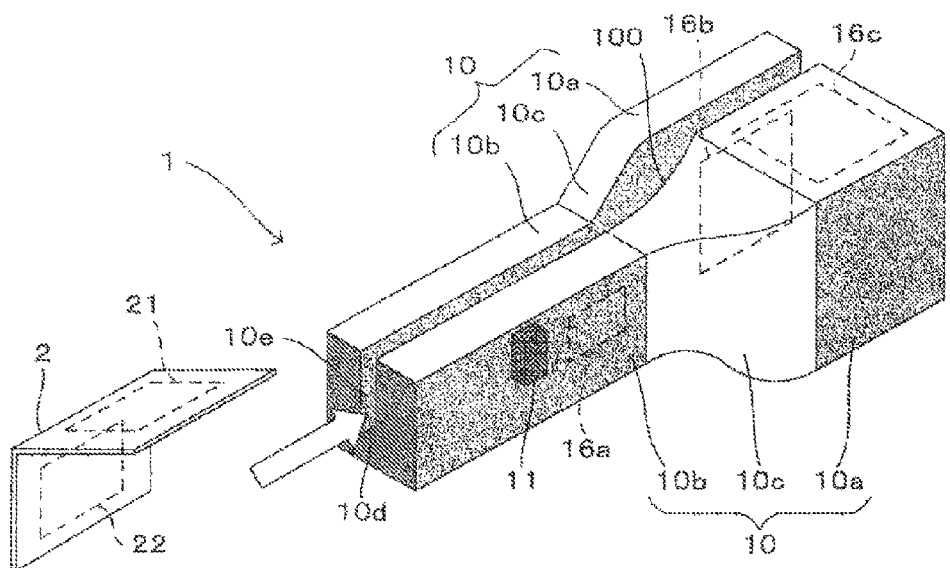
FIG. 1 includes schematic drawings to show an appearance structure of an information reading apparatus relating to an embodiment No. 1 of the present invention.
Figure 1:
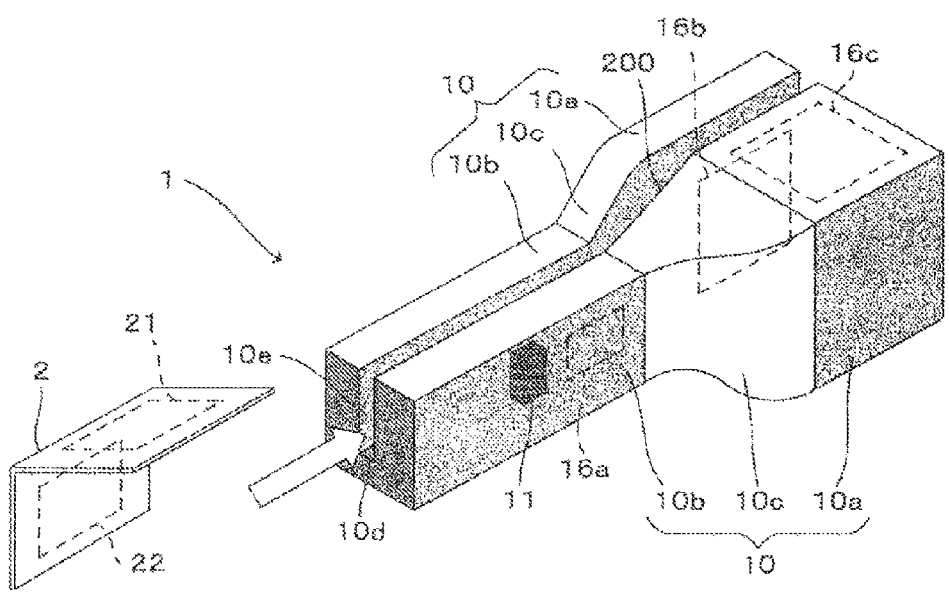

Mechanical Structure of the Embodiment No. 1:

FIG. 1 includes schematic drawings to show an appearance structure of an information reading apparatus 1 relating to the embodiment No. 1 of the present invention.

In FIG. 1A, an information reading apparatus 1 has a frame 10 whose form in its cross section is U-shaped, and the frame 10 includes a first frame section 10a, a second frame section 10b, and a third frame section 10c. Then, a bottom section of the first frame section 10a, the second frame section 10b, and the third frame section 10c is formed as a transfer basis surface 10d. Meanwhile, a transfer path 10e is formed between two side plate sections which sandwich the transfer basis surface 10d and face each other.

On the other hand, in an electronic passport 2 (hereinafter, to be simply called "passport 2") of a booklet-like information recording medium as an example of an information recording medium; a non-contact IC chip (not illustrated), which electronically records various kinds of information through wireless communication, and an antenna 21 (or an antenna 22), which sends and receives information through electromagnetic induction, are embedded. Incidentally, although FIG. 1A shows both the antenna 21 and the antenna 22, usually only one of the two exists. Furthermore, on a front side surface (or a reverse side surface) of the passport 2; a two-dimensional barcode including coded information, a facial portrait of an owner of the passport 2, and an OCR character are printed, although they are not illustrated on the drawing. Moreover, the information reading apparatus 1 relating to the present embodiment can read information of not only the passport 2 but also a card-sized identification card (for example, a visa card, a citizen ID card, a banking card, and so on).

On this occasion, in the information reading apparatus 1, an image sensor 11 for optically reading an OCR character, etc., printed on the front side surface of the passport 2, is placed at the second frame section 10b that forms the transfer path 10e. Furthermore, 3 non-contact communication antennas 16a through 16c (each to be regarded as an RF antenna in the present embodiment), for sending and receiving information to/from the antenna 21 or the antenna 22 embedded in the passport 2 through electromagnetic induction, are placed at the second frame section 10b or the first frame section 10a (corresponding to an example of an extended part) that forms the transfer path 10e.

The non-contact communication antennas 16a is used for communication with a non-contact IC chip embedded in a card-sized identification card (not illustrated), while the non-contact communication antenna 16b and the non-contact communication antenna 16c are used for communication with a non-contact IC chip embedded in the passport 2. In regard to the latter, the reason why two non-contact communication antennas are used is because a position of the antenna (the antenna 21 or the antenna 22) embedded in the passport 2 is different depending on a country that issues the passport.

Especially with regard to the non-contact communication antenna 16b and the non-contact communication antenna 16c, each of the two antennas is placed on each of two planes that are perpendicular to each other. That is to say, the non-contact communication antenna 16b is placed along with the transfer path 10e in the first frame section 10a, while the non-contact communication antenna 16c is placed so as to be perpendicular to the transfer path 10e in the first frame section 10a.

All the non-contact communication antennas 16a through 16c are positioned after the image sensor 11, and laid out around one and the same transfer path for a swiping operation, namely, the transfer path 10e, as described above. That is to say, along a direction in which the passport 2 is swiped, the image sensor 11 and the non-contact communication antennas 16a through 16c are placed in due order. Incidentally, although it is possible to carry out communication with a card-sized identification card at the non-contact communication antenna 16b and the non-contact communication antenna 16c, it is preferable that the communication is carried out at the non-contact communication antenna 16a while operability being taken into consideration.

The first frame section 10a is formed so as to have its depth down to the transfer basis surface 10d deeper than the second frame section 10b has. In other words, a groove of the first frame section 10a is deeper than a groove of the second frame section 10b (a height of the case is taller). A reason for such an arrangement is to make it easy to hold the passport 2 that has its size larger than the card-sized identification card; and furthermore with the arrangement, it becomes possible to lay the non-contact communication antenna 16b and the non-contact communication antenna 16c which are still larger than the non-contact communication antenna 16a. As shown in FIG. 1A, the passport 2 opened so as to be L-shaped (reverse L-shaped) is fit into a deep groove part and held at a position where one of the antennas meets its corresponding antenna.

The first frame section 10a and the second frame section 10b are made to be continuous by the intermediary of the third frame section 10c, which is formed with a round shape part 100. That is to say, the third frame section 10c is rimmed with the round shape part 100. Therefore, even in a case where the passport 2 being not opened adequately is swiped, the third frame section gradually opens the passport 2 and has no hooking part that may prevent an appropriate swiping operation.

By the way, though the third frame section 10c in the present embodiment is formed with a round shape part 100 as shown in FIG. 1A, the third frame section may be formed with a chamfered part 200, for example as shown in FIG. 1B. In such a case, there comes up an advantage that manufacturing the section can be done easily.

Figure 2:
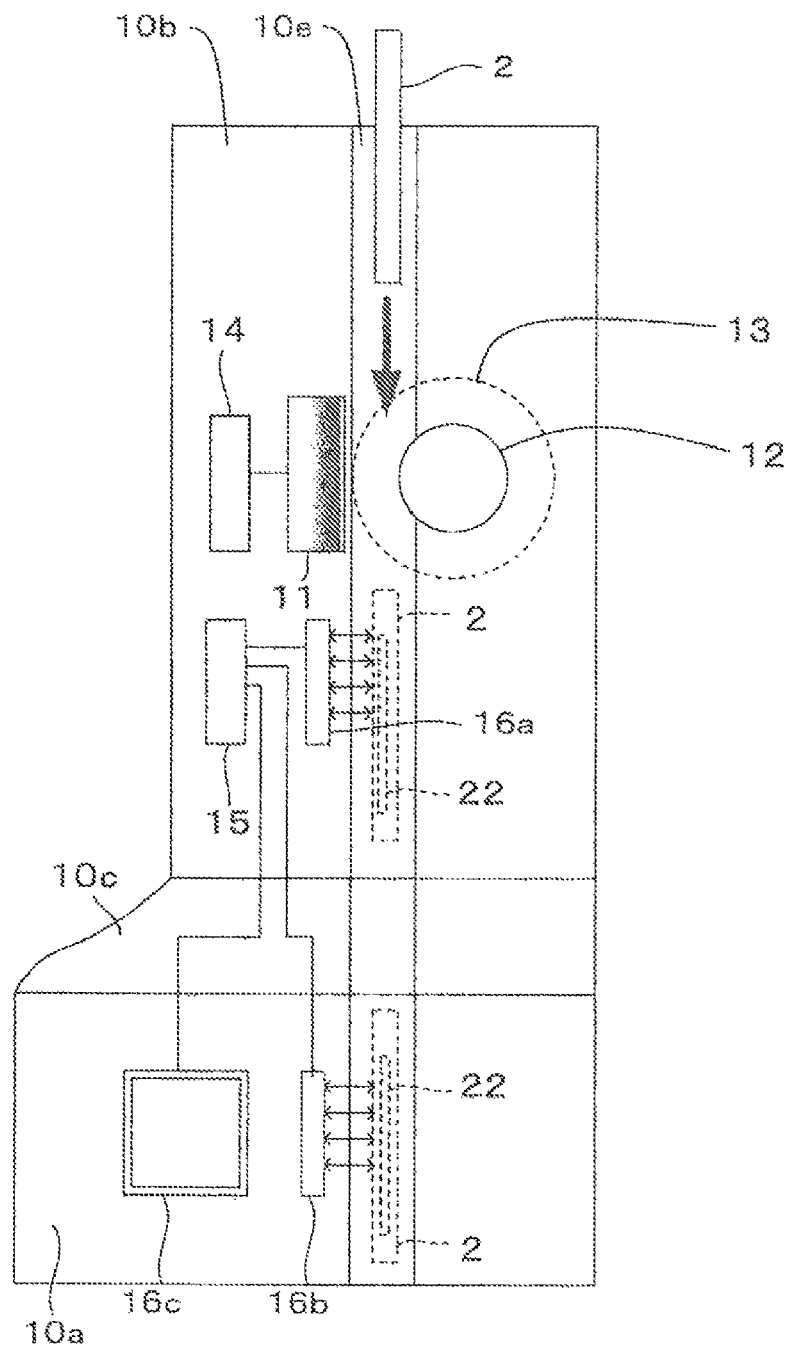
FIG. 2 is a schematic drawing to show an outline of an electrical structure of the information reading apparatus relating to the embodiment No. 1 of the present invention.

Electrical Structure of the Embodiment No. 1:

FIG. 2 is a schematic drawing to show an outline of an electrical structure of the information reading apparatus 1 relating to the embodiment No. 1 of the present invention.

In FIG. 2, the second frame section 10b of the information reading apparatus 1 includes: the image sensor 11, a pad roller 12 that rotates while contacting the passport 2 when the passport 2 passes through the transfer path 10e, and an encoder 13 that obtains information on a position of the passport 2 by detecting rotation of the pad roller 12. Then, the image sensor 11 is electrically connected to an image processing section 14 that carries out various processes for the captured image data including the two-dimensional barcode, the facial portrait, and the OCR character.

On the other hand, as described above; the second frame section 10b is equipped with the non-contact communication antenna 16a, and meanwhile the first frame section 10a is equipped with the non-contact communication antenna 16b and the non-contact communication antenna 16c. Then, the non-contact communication antennas 16a through 16c are electrically connected to an RF communication section 15 that reads information recorded in the non-contact IC chip inside the passport 2 through wireless communication and records information into the non-contact IC chip inside the passport 2 through wireless communication.

On this occasion, as shown in FIG. 2, the pad roller 12 protrudes a little from the transfer path 10e so that the passport 2 is pressed against a side of the image sensor 11 by the protrusion part. That is to say, the pad roller 12 works as an example of a pressing member that presses the passport 2 in a direction perpendicular to the transfer direction. Incidentally, in the present embodiment, though only the second frame section 10b is equipped with the pressing member, it is possible that, for example, the first frame section 10a is also equipped with a pressing member in the same manner. According to this arrangement, it becomes possible to prevent the passport 2 and the non-contact communication antenna 16b from getting separated from each other while the two are in communicating operation. As a result, an operator of the task described above can carry out other work during the task without worrying about the task. Incidentally, in the present embodiment; the pad roller 12 (e.g., equipped with a spring) is placed as an example of the pressing member, however any other means such as a plate spring, a coil spring, and so on may be used instead as far as the means hold the passport 2 so as to prevent the passport from becoming detached.

An electrical structure of the image processing section 14 and the RF communication section 15 is described next in details with reference to FIG. 3.

Figure 3:
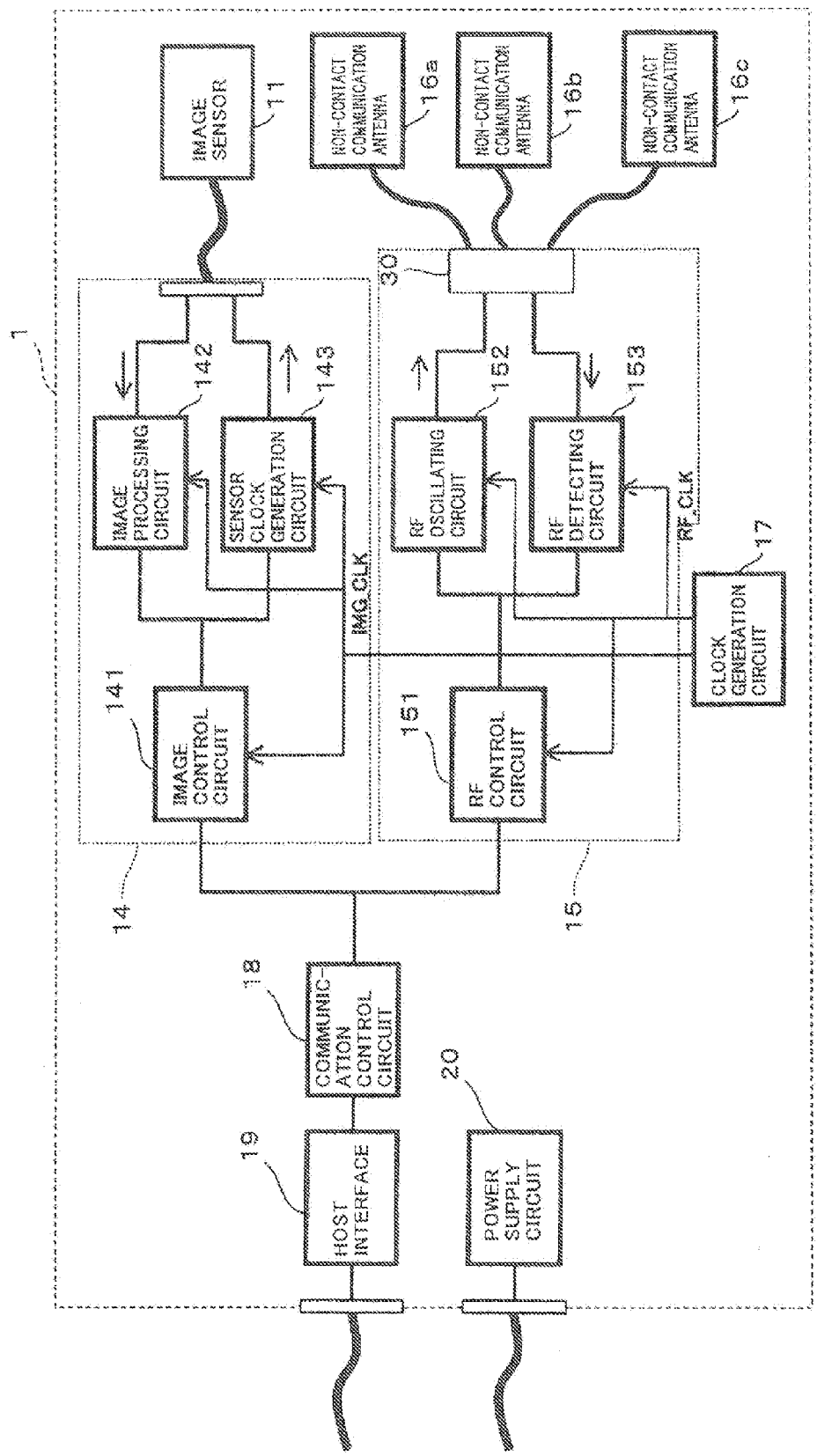
FIG. 3 is a block diagram to show a detailed electrical structure of the information reading apparatus relating to the embodiment No. 1 of the present invention.
Figure 4:
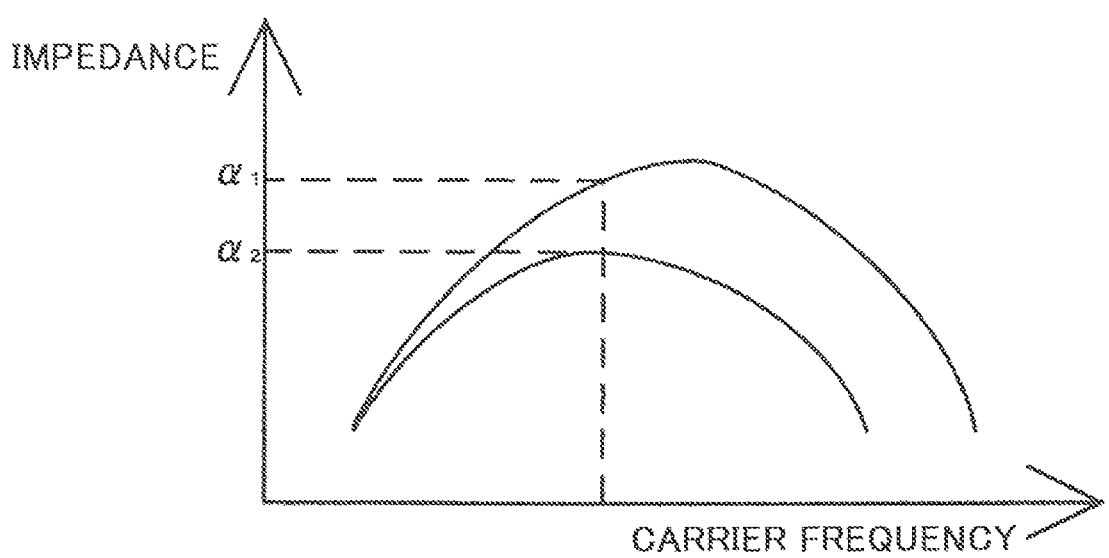
FIG. 4 is a drawing to show impedance characteristics of a non-contact communication antenna.

FIG. 3 is a block diagram to show a detailed electrical structure of the information reading apparatus 1 relating to the embodiment No. 1 of the present invention.

In FIG. 3, the information reading apparatus 1 includes: the image processing section 14, the RF communication section 15, a clock generation circuit 17, a communication control circuit 18, a host interface 19, and a power supply circuit 20. Incidentally, indication of commonplace electronic elements such as a CPU, a ROM, a RAM, and so on is omitted on the drawing.

The image sensor 11 is connected to the image processing section 14, as described above, and meanwhile an RF antenna 16 is connected to the RF communication section 15, as described above. Furthermore, both the image processing section 14 and the RF communication section 15 are connected to the host interface 19 through the communication control circuit 18, and then the host interface 19 is connected to, for example, an upper system such as an ATM machine of a bank (not illustrated). Thus, the information reading apparatus 1 carries out sending and receiving information to/from the upper system through a single interface. Moreover, the power supply circuit 20 of the swiping-type information processing apparatus 1 supplies each section with electric power by using electric power sent from the upper system.

The image processing section 14 is connected to the communication control circuit 18, and the image processing section 14 includes: an image control circuit 141 which extensively controls the image processing section 14, an image processing circuit 142 which carries out various processes for image data sent from the image sensor 11, and a sensor clock generation circuit 143 which generates a sensor clock required for driving the image sensor 11.

In the meantime, the RF communication section 15 is connected to the communication control circuit 18, and the RF communication section 15 includes: an RF control circuit 151 which extensively controls the RF communication section 15, an RF oscillating circuit 152 which sends a predefined signal placed on a carrier wave to the non-contact communication antennas 16*a* through 16*c*, and an RF detecting circuit 153 which extracts a predefined signal (to detect the signal by removing the carrier wave) from information sent from the non-contact communication antennas 16*a* through 16*c*.

Then, an electrical signal that operates the image processing section 14 including the image control circuit 141, the image processing circuit 142, and the sensor clock generation circuit 143; and an electrical signal that operates the RF communication section 15 including the RF control circuit 151, the RF oscillating circuit 152, and the RF detecting circuit 153 are sent from the clock generation circuit 17.

On this occasion, the information reading apparatus 1 includes the 3 non-contact communication antennas 16*a* through 16*c* as shown in FIG. 2, and one of the three described above is selected at the time of communication with the non-contact IC chip embedded in the passport 2. By means of polling the 3 non-contact communication antennas 16*a* through 16*c* after reading the OCR character by swiping operation, it is possible to check which one of the non-contact communication antennas 16*a* through 16*c* is facing the antenna (one of the antenna 21 and the antenna 22) embedded in the passport 2.

Specifically, the non-contact communication antennas 16*a* through 16*c* are switched by an analog multiplexer 30 shown in FIG. 3. Then, the analog multiplexer 30 and the RF communication section 15 carry out an activating operation of the non-contact communication antennas every time when the switching operation is done, so as to look up a non-contact communication antenna with which communication can be done. Incidentally, in the present embodiment, the analog multiplexer 30 is used as a means for looking up a non-contact communication antenna, with which communication can be done, among the non-contact communication antennas 16*a* through 16*c*. However, the present invention is not limited to the embodiment, and for example, a relay-type multiplexer may be used.

Advantageous Effect of the Embodiment No. 1:

As described above, according to the information reading apparatus 1 relating to the present embodiment, the image sensor 11 and the non-contact communication antennas 16*a* through 16*c* are laid out in a frame (including the first frame section 10*a* or the second frame section 10*b*) which constructs one and the same transfer path 10*e*. Therefore, one transfer operation makes it possible to carry out a required process (for example, a series of sequential steps of the international standard) so that operability can be improved eventually.

Furthermore, even if it is not known where the position of the antenna embedded in the passport 2 is (whether at a position of the antenna 21 or at a position of the antenna 22), sending and receiving information can be done by using one of the non-contact communication antennas 16*a* through 16*c*. Therefore, it becomes possible to further improve operability by reducing the number of errors and to improve reliability as well.

Moreover, with regard to the non-contact communication antenna 16*a* and the non-contact communication antenna 16*c*, each of the two antennas is placed on each of two planes that are perpendicular to each other. Therefore, the information reading apparatus 1 can be provided with a function of holding the passport 2. Then, other work can be done during non-contact communication.

Still further, since the third frame section 10*c* is formed so as to have the round shape part 100, the passport 2 can be opened by itself during swiping operation so that operability can be improved. Moreover, by providing the first frame section 10*a* with the pressing member described above, it becomes possible to prevent the passport 2 and the non-contact communication antenna 16*b* from leaving away from each other.

Furthermore, through polling the non-contact communication antennas 16*a* through 16*c* by using the analog multiplexer 30, it is possible to simply and quickly look up a non-contact communication antenna with which communication can be done, so that operability can be improved. Still further, it is also possible to improve operability by the one-wire communication described above.

Modification of the Embodiment No. 1:

In the embodiment described above, the information reading apparatus 1 is a system in which the swiping-type scanner (corresponding to the second frame section 10*b*) and the reader-writer for the passport 2 (corresponding to the first frame section 10*a*) are combined. The system may be built in an automatic processing apparatus placed in an airport or a hotel lobby, and a case may be constructed with a panel of the automatic processing apparatus.

Furthermore, though the non-contact communication antennas 16*a* through 16*c* are described as 3 units, it is still possible that the non-contact communication antenna 16*a* does not exist, or one of the non-contact communication antenna 16*b* and the non-contact communication antenna 16c, which are positioned at a later section, is removed so as to meet a requirement for an arrangement of an application.

Furthermore, it is described above that presence of activation is detected for the purpose of checking by polling, to which non-contact communication antenna the passport 2 is held up. However, the present invention is not limited to the embodiment described above. For example, detecting the presence of activation is to check if communication has been carried out or not. Then, in the case of a system in which a time until activation matters, checking if there has been a change in a signal from a side of the passport 2 may also be done instead, as a simple alternative method. If it is required to shorten a process time for the detection, a change of a resonance point at a side of the information reading apparatus (the reader-writer) may be monitored or a method of watching a change in load may be done alternatively to accomplish the above purpose. More specifically, by using the RF detecting circuit 153, monitoring is carried out with AM detection in regard to a change of a resonance point at a side of the information reading apparatus 1 or a change in load of the non-contact communication antennas 16a through 16c. For example, a characteristic shown in FIG. 4 (an impedance characteristic) with regard to each of the non-contact communication antennas is monitored. Then, at the time when a non-contact communication antenna is found to have a change in impedance from a1 to a2, it can be known that the passport 2 is held up to the non-contact communication antenna. Incidentally, by detection on activation, it is possible to recognize for sure where the passport 2 is positioned, so that this method can be considered to be highly reliable.

Furthermore, in the present embodiment, the non-contact communication antennas 16a through 16c are placed at fixed positions. However, if the non-contact communication antennas are taken out for the purpose of additionally installing an antenna block at an optional position and then an antenna section after the analog multiplexer is placed to be taken out from the scanner section by using a connector and so on; applicability of the information reading apparatus can be enhanced and it becomes easy to install the apparatus with one wire.

Still further, a restricting member that controls passage of the passport 2 (for example, a lock pin) may be placed within the transfer path 10e at an end of a section formed by the first frame section 10a (at an end opposite from the third frame 10c). According to this structure, the passport 2 being transferred through the transfer path 10e can be stopped easily at a desired position.

That is to say, temporarily stopping the passport 2 at the first frame section 10a while swiping the passport 2 is carried out not by man-caused operation but by using the restricting member. Therefore, it is not requested for a user to care about a need of "stopping at a predefined position during a swiping operation", and the passport 2 can easily be stopped at the predefined position. Accordingly, it is possible to prevent a transfer speed of the passport 2 from changing at any unnecessary position so that reliability of the information reading apparatus 1 can be improved.

Incidentally, the restricting member may be any component such as a lock pin, a movable restricting member that moves in a direction almost perpendicular to a transfer direction of the passport 2, and a lever to be moved by an actuator. When a lever to be moved by an actuator is used, no man-caused operation exists and therefore the passport 2 can surely be stopped at a desired position at an appropriate time. Furthermore, the restricting member may be located at a boundary between the second frame section 10b and the third frame section 10c. According to this structure, it is possible to provide another type of the information reading apparatus 1, in which only the non-contact communication antenna 16a can carry out communication; in other words, with which only a card-sized identification card can communicate.

Furthermore, although two different clock signals are output from the clock generation circuit 17 (refer to FIG. 3) in the present embodiment, a phase of the clock signals may be synchronized. More specifically, the clock generation circuit 17 is equipped with a frequency dividing circuit; and one of the two clock signals described above is output directly from a source of the clock signal as it is, and meanwhile the other of the two clock signals output from the source of the clock signal is output after passing through the frequency dividing circuit. Thus, a phase of a clock signal to be supplied to the image processing section 14 and a phase of a clock signal to be supplied to the RF communication section 15 get into a synchronized condition.

Consequently, even if an electromagnetic crosstalk occurs between the image processing section 14 and the RF communication section 15, what occurs is a stable noise (a cyclic noise) and the stable noise can be removed more easily than an unstable noise (a non-cyclic noise) is. As a result, for example, it is possible to prevent a beat noise (a buzz) from occurring due to an electric interaction and to prevent a beat noise from being generated due to leakage entering of a power supply system so as to avoid deterioration of image quality and communication quality.

Second Embodiment

Next a second embodiment (hereinafter, to be called "the embodiment No. 2"), in which an information reading apparatus is equipped with a restricting member in the case of the embodiment No. 1 described above, is described below with reference to FIG. 5 through FIG. 12, as a preferred embodiment of the present invention. Incidentally, for reference drawings and descriptions, those that are the same as the embodiment No. 1 are not explained again and amount to an intentional omission.

Figure 5:
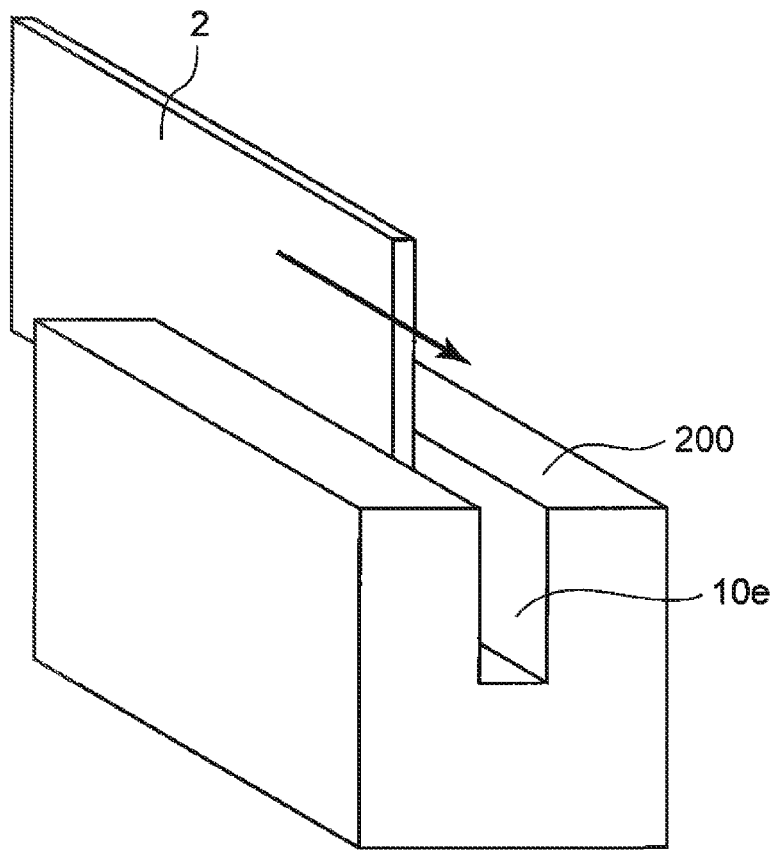
FIG. 5 includes schematic drawings to show an appearance structure of a swiping-type information processing apparatus relating to an embodiment No. 2 of the present invention.
Figure 5:
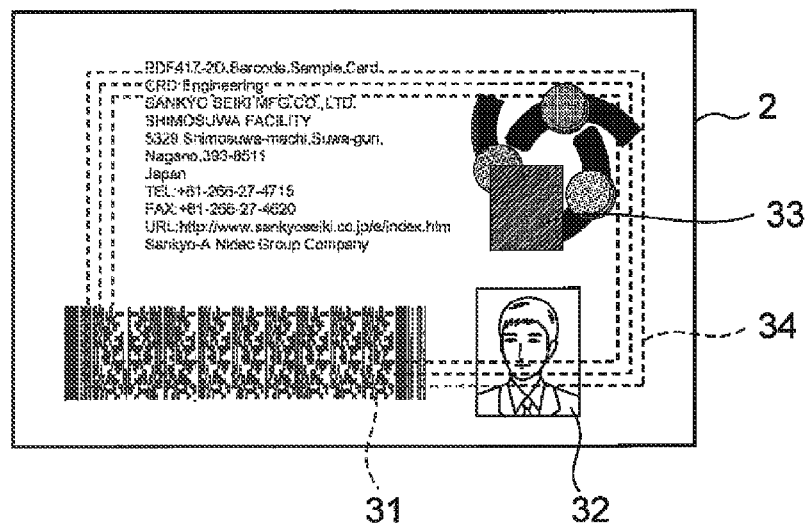

Appearance Structure of the Embodiment No. 2:

FIG. 5 includes schematic drawings to show an appearance structure of a swiping-type information processing apparatus 200 relating to an embodiment No. 2 of the present invention. FIG. 5A shows a condition in which a card 2 is being passed through the swiping-type information processing apparatus 200, and meanwhile FIG. 5B shows an enlarged front view of the card 2.

In FIG. 5A, the swiping-type information processing apparatus 200 relating to the embodiment No. 2 of the present invention has a frame whose form in its cross section is U-shaped, and a bottom section of the frame is formed as a card traveling basis surface (a transfer basis surface). Meanwhile, the transfer path 10e is formed between two side plate sections which sandwich the bottom section and face each other.

FIG. 5 is a drawing that shows only the second frame section 10b of the information reading apparatus 1 of the embodiment No. 1. It should be noted that at this point the image sensor 11 and the non-contact communication antenna 16 are not illustrated.

In FIG: 5B, the card 2 is an ordinary card according to TIS (Japanese Industrial Standards), which is a plastic card sized; for example, 86 mm in width, 54 mm in height, and 0.76 mm in thickness. By the way, though a plastic card is adopted in this embodiment, the type of card does not matter and any other kind of card including; for example, a paper card such as a coupon card, an IC card inside which an IC chip is embedded, a rewritable card whose surface is provided with a special coating so as to enable rewriting data, and so on may be adopted. Furthermore, concerning size of the card, any size may be adopted for example various kinds of passports. Moreover, the card includes various information recording media such as a card-sized identification card (a visa card, a citizen ID card, a banking card, and so on).

On a surface of the card 2, there are printed a two-dimensional barcode 31 including various kinds of coded information as well as a facial portrait 32 including visual characteristics of an owner of the card 2. Furthermore in the card, there are embedded an RFIC chip 33, as a non-contact IC chip, for electrically storing and processing various kinds of information, and an antenna coil 34 for sending and receiving information to; from the RF antenna 16 (refer to FIG. 5) through electromagnetic induction.

Incidentally, although not illustrated in FIG. 5B, the RFIC chip 33 and the antenna coil 34 are electrically connected with enameled wire and so on. On the other hand, in FIG. 5B, the RFIC chip 33 and the antenna coil 34, both of which are embedded in the card 2, can be seen visually but the illustration of these two is as a matter of convenience for explanation. Furthermore, on the drawing, the antenna coil 34 is placed so as to surround almost a whole section of the card 2, but the present invention is not limited to this arrangement and another arrangement may be applied as far as size and a layout of the antenna coil enables communication with the RF antenna 16.

Figure 6:
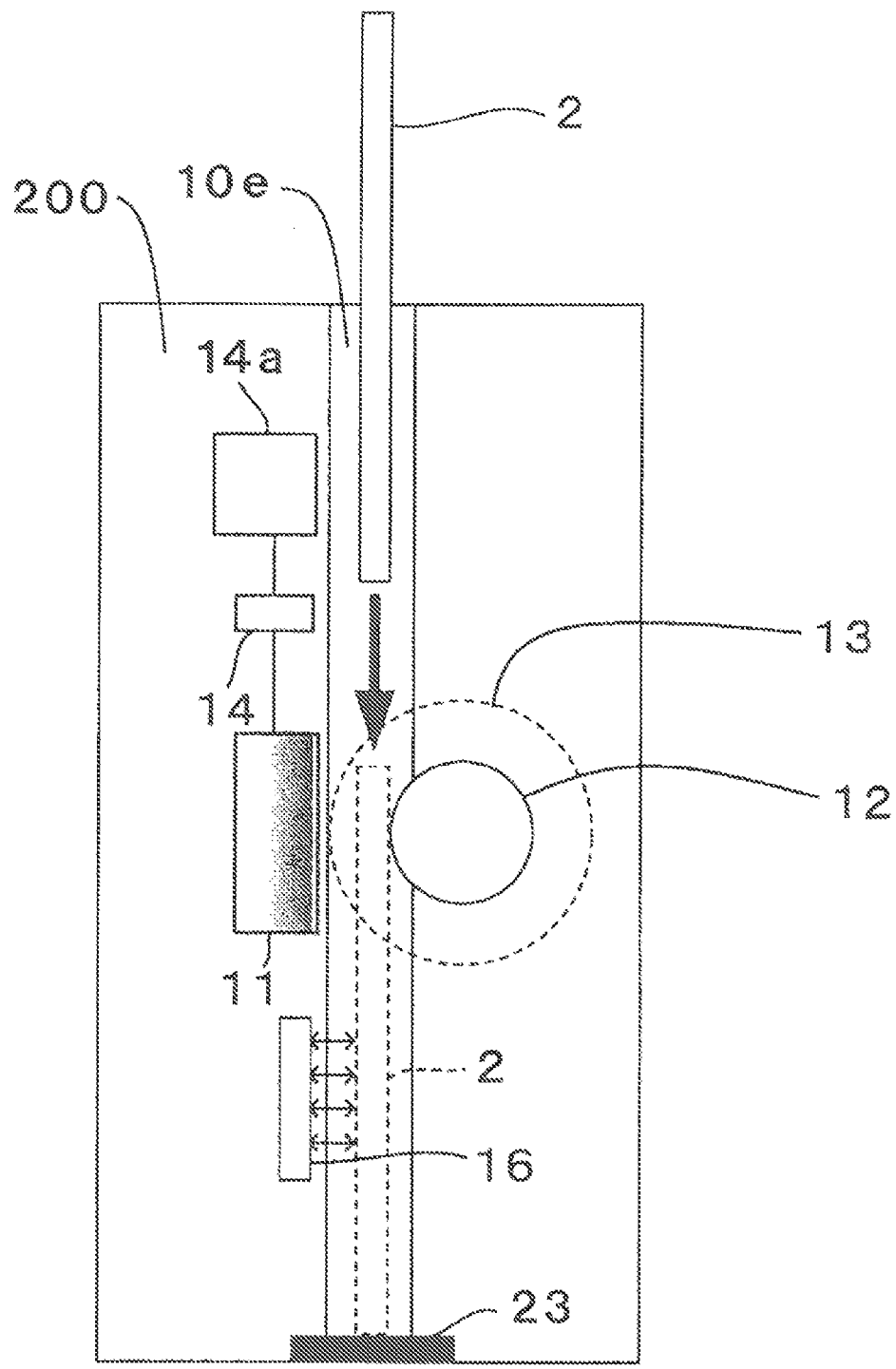
FIG. 6 is a schematic drawing to show an outline of a mechanical and electrical structure of a swiping-type image scanner relating to the embodiment No. 2 of the present invention.

FIG. 6 is a schematic drawing to show an outline of a mechanical and electrical structure of a swiping-type image scanner relating to the embodiment No. 2 of the present invention: As shown in FIG. 6, at first the image sensor (an image pickup device) 11 captures an image of the two-dimensional barcode 33 and the facial portrait 32 of the card 2, which passes through the transfer path 10e, by means of photoelectric conversion. Then, image data of the two-dimensional barcode 33 and the facial portrait 32, which are captured, is stored in the image memory 14. Afterwards, an image processing means 14a reads the image data stored in the image memory 14 and carries out signal processing such as position detection processing, structure analysis processing, decoding processing, and so on. Thus, reading optical information finishes.

Subsequently, when the card 2 bumps against a rubber plate 27, the card 2 stops. At the time, information is sent and received through electromagnetic induction between the antenna coil 34 embedded in the card 2 and the RF antenna 16. In the end, after reading electromagnetic information finishes, the card 2 is pulled out (in a downward direction in FIG. 6). In the present embodiment, after reading optical information finishes, reading electromagnetic information finishes. However, the two reading operations described above may be carried out at the same time, or the two reading operations may be done in reverse order. Furthermore, when a dip-type information reading apparatus is adopted as the information reading apparatus, the card 2 is pulled out in a direction opposite to a direction in which the card is inserted.

Thus, according to the swiping-type information processing apparatus 200 relating to the present embodiment, it is possible to easily stop (to stop temporarily) the card 2 passing through the transfer path 10e at a predefined position (a position where information can be sent and received appropriately between the antenna coil 34 and the RF antenna 16) so that workability can be improved in comparison with a conventional information reading apparatus. Furthermore, it is not requested for a user of the swiping-type information processing apparatus 200 to care about a need of "stopping at a predefined position during a swiping operation", and therefore operation errors lessen and even an optically-challenged person can stop the card 2 at the predefined position. Moreover, since there is no need to be conscious of taking such care, a change in the transfer speed of the card 2 around a position facing to the image sensor 11 (the pad roller 12) in the transfer path 10e can be avoided and then consequently it becomes possible to prevent accuracy of reading the two-dimensional barcode 31 from getting deteriorated.

Incidentally, even in a case where a dip-type information reading apparatus or a motor-type information reading apparatus is adopted, the same effect as obtained by the swiping-type information processing apparatus can be obtained if an arrangement is made so as to send and receive information by way of electromagnetic induction between the antenna coil 34, embedded in the card 2 being transferred, and the RF antenna 16.

Figure 7:
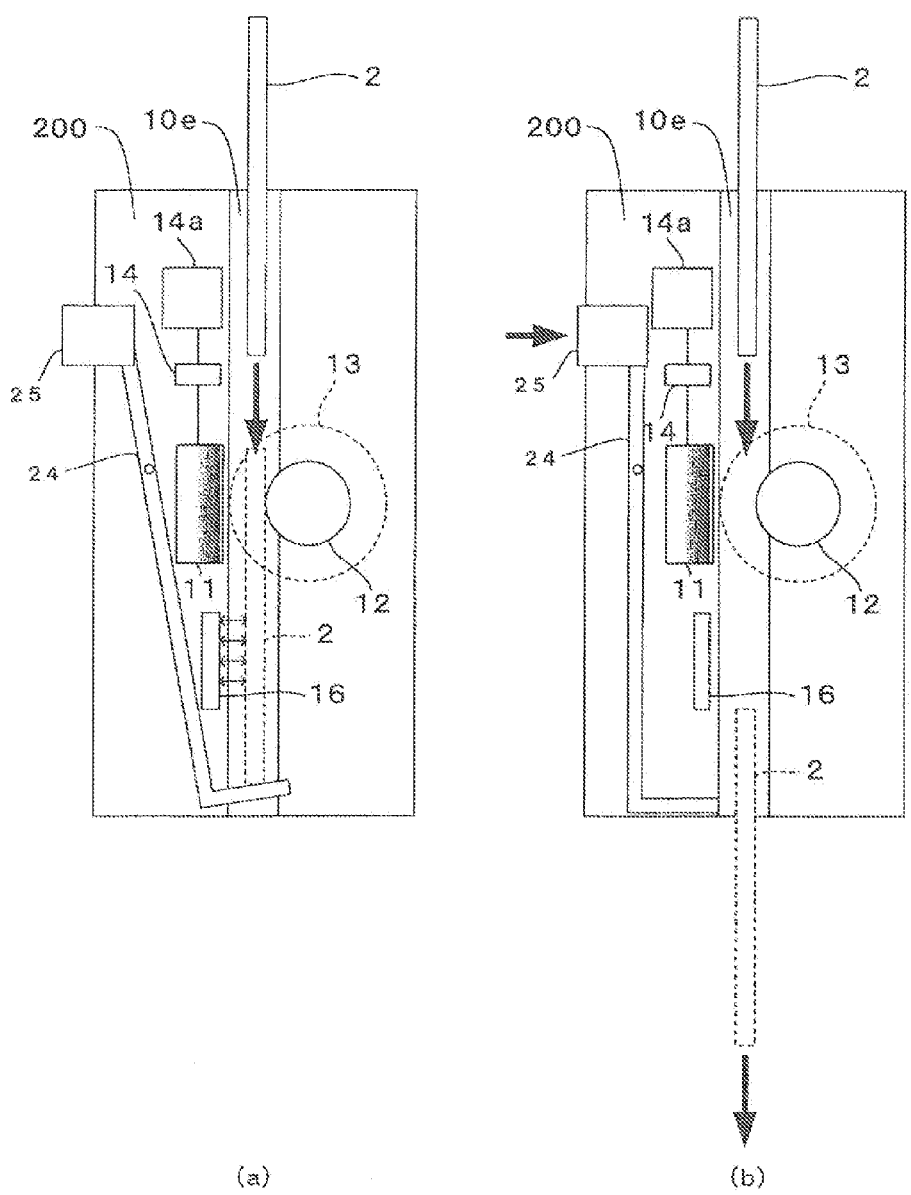
FIG. 7 includes schematic drawings to show an outline of a mechanical and electrical structure of a swiping-type information reading apparatus relating to a modification of the embodiment No. 2.

Modification of the Embodiment No. 2:

FIG. 7 includes schematic drawings to show an outline of a mechanical and electrical structure of the swiping-type information reading apparatus 200 relating to a modification of the embodiment No. 2 of the present invention. A point unique to the swiping-type information reading apparatus 200 shown in FIG. 7 is that a lever 24, which is L-shaped and whose tip part is protruded into the transfer path 10e, is adopted as a restricting member. Incidentally, each of the elements shown in FIG. 6 is referred to by the same reference numeral in FIG. 7.

As shown in FIG. 7A, at first, the lever 24 is in a condition where the tip part is protruded into the transfer path 10e so as to restrict a passage of the card 2. Subsequently, when the card 2 bumps against the lever 24, information is sent and received between the antenna coil 34 embedded in the card 2 and the RF antenna 16. Afterward, pressing a button 25 makes the lever 24 drawn into (a frame part of) the swiping-type information reading apparatus 200 to lift the restriction of the passage of the card 2 so that swiping operation can be carried out down to an end part (refer to FIG. 7B). Then, releasing the button 25 restores the lever 24 as it was, by an activating means such as a spring and so on (not illustrated).

Thus, according to the present embodiment, it is possible to control the lever 24 by pressing the button 25 or not, so as to either protrude the lever 24 into the transfer path 10e or draw the lever 24 into the frame part, and therefore operability can be improved. Furthermore, as shown on the drawing; the lever 24, being L-shaped and constructed with one piece of material, is used and therefore operability can be improved easily and inexpensively.

Figure 8:
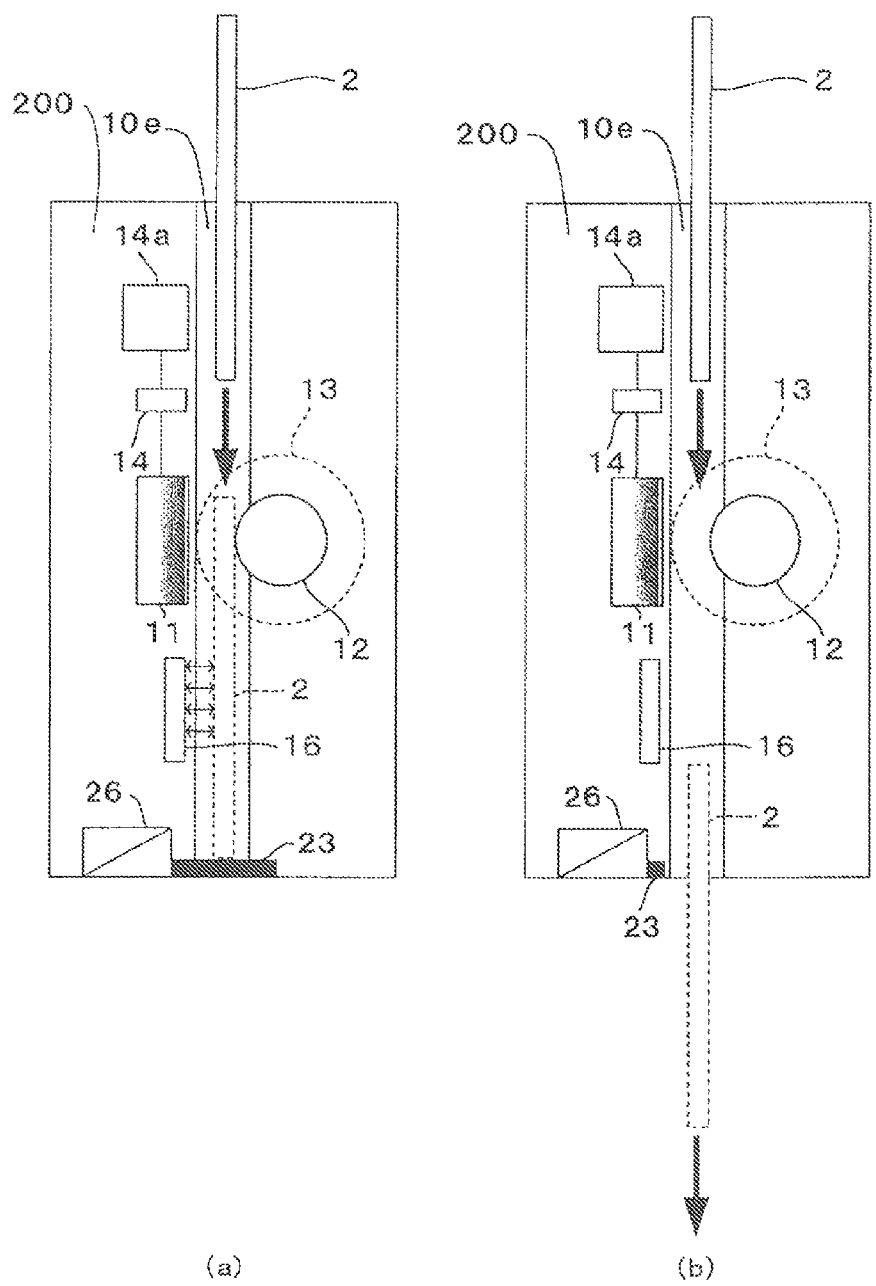
FIG. 8 includes schematic drawings to show an outline of a mechanical and electrical structure of a swiping-type information reading apparatus relating to another modification of the embodiment No. 2.

FIG. 8 includes schematic drawings to show an outline of a mechanical and electrical structure of the swiping-type information reading apparatus 200 relating to another modification of the embodiment No. 2. A point unique to the swiping-type information reading apparatus 200 shown in FIG. 8 is that the rubber plate 23 is moved by an actuator 26 such as a solenoid. Incidentally, each of the elements shown in FIG. 6 is referred by the same reference numeral in FIG. 8.

As shown in. FIG. 8A, at first, the rubber plate 23 is placed at a position where a passage of the card 2 is restricted. Subsequently, when the card 2 bumps against the rubber plate 23, information is sent and received between the antenna coil 34 embedded in the card 2 and the RF antenna 16. Then, after spending a predefined time (for example, one second), the actuator 26 draws the rubber plate 23 into (a frame part of) the swiping-type information reading apparatus 200 to lift the restriction of the passage of the card 2 so that swiping operation can be carried out down to an end part (refer to FIG. 8B).

Thus, according to the present embodiment, it is possible to control the rubber plate 23 by using a function of the actuator 26 to either cause the rubber plate 23 to protrude into the transfer path 10e or draw the rubber plate 23 into the frame part; therefore operability can further be improved. Moreover, for example, it is still possible to lift the restriction of the passage of the card 2 by sending a command from a host side system (not illustrated) for drawing the rubber plate 23. Incidentally, in the present embodiment, the rubber plate 23 moves in a horizontal direction on the drawing, but the present invention is not limited to the embodiment and the rubber plate 23 may move in a vertical direction or an oblique direction, for example, on the drawing.

Figure 9:
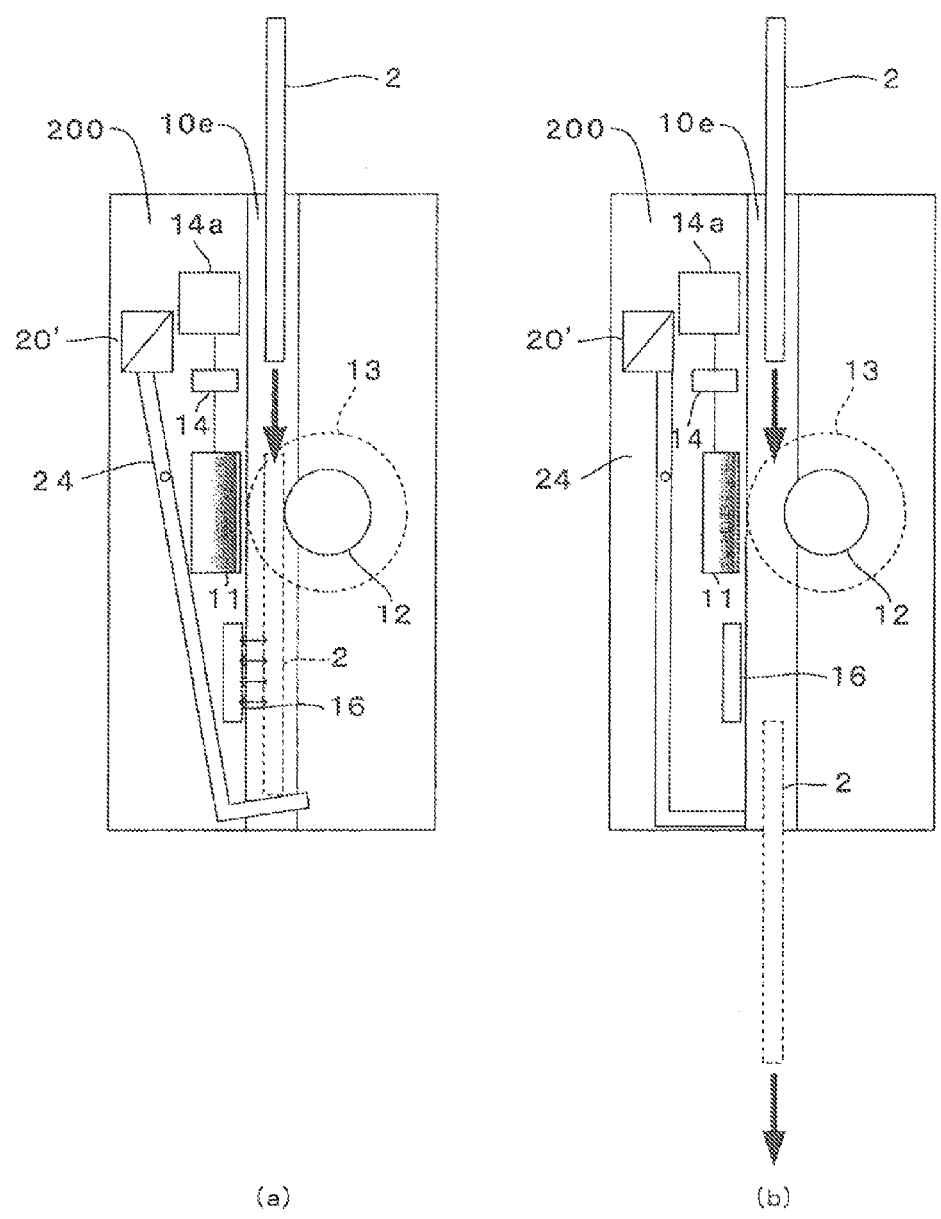
FIG. 9 includes schematic drawings to show an outline of a mechanical and electrical structure of a swiping-type information reading apparatus relating to still another modification of the embodiment No. 2.

FIG. 9 includes schematic drawings to show an outline of a mechanical and electrical structure of the swiping-type information reading apparatus 200 relating to still another modification of the embodiment No. 2. A point unique to the swiping-type information reading apparatus 200 shown in FIG. 9 is that protruding and drawing the lever 24 shown in FIG. 7 is implemented by using an actuator 20'. Incidentally, each of the same elements as shown in FIG. 6 is referred with the same reference numeral.

In the same manner as described with reference to FIG. 7, after sending and receiving information between the antenna coil 34 and the RF antenna 16 finishes, lifting the restriction of the passage of the card 2 is implemented by a function of the actuator 20' in FIG. 9. Therefore, according to the present embodiment, operability can further be improved.

Figure 10:
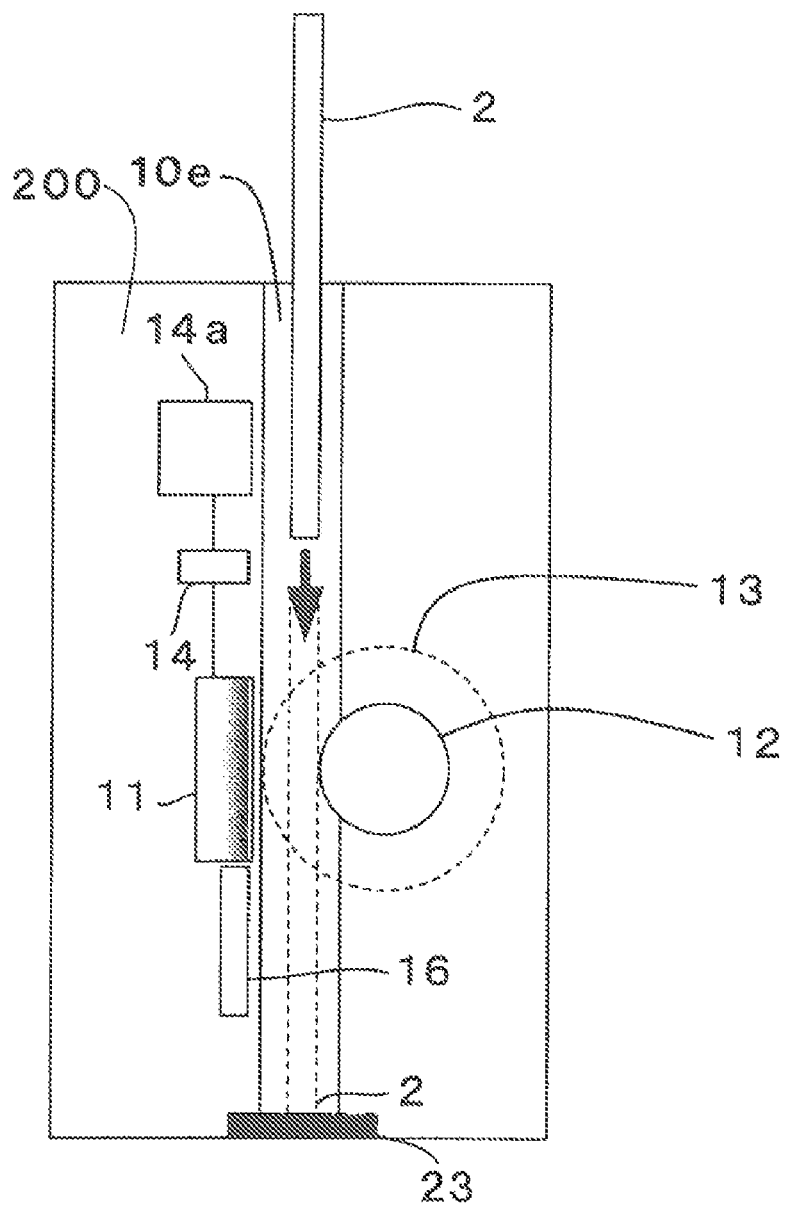
FIG. 10 is a schematic drawing to show a condition in which an RF antenna is placed so as to be adjacent to an image sensor.

FIG. 10 is a schematic drawing to show a condition in which the RF antenna 16 is placed so as to be adjacent to the image sensor 11. The swiping-type information reading apparatus 200 shown in FIG. 10 is shorter in a transfer direction than the swiping-type information reading apparatus 200 shown in FIG. 6. When the RF antenna 16 is placed so as to be adjacent to the image sensor 11 according to a concept of implementation of both reading optical information and reading electromagnetic information together as described, a compact design can be materialized. Incidentally, though the rubber plate 23 is placed at an end of the transfer path 10e in this case, the rubber plate 23 is not necessarily required.

Figure 11:
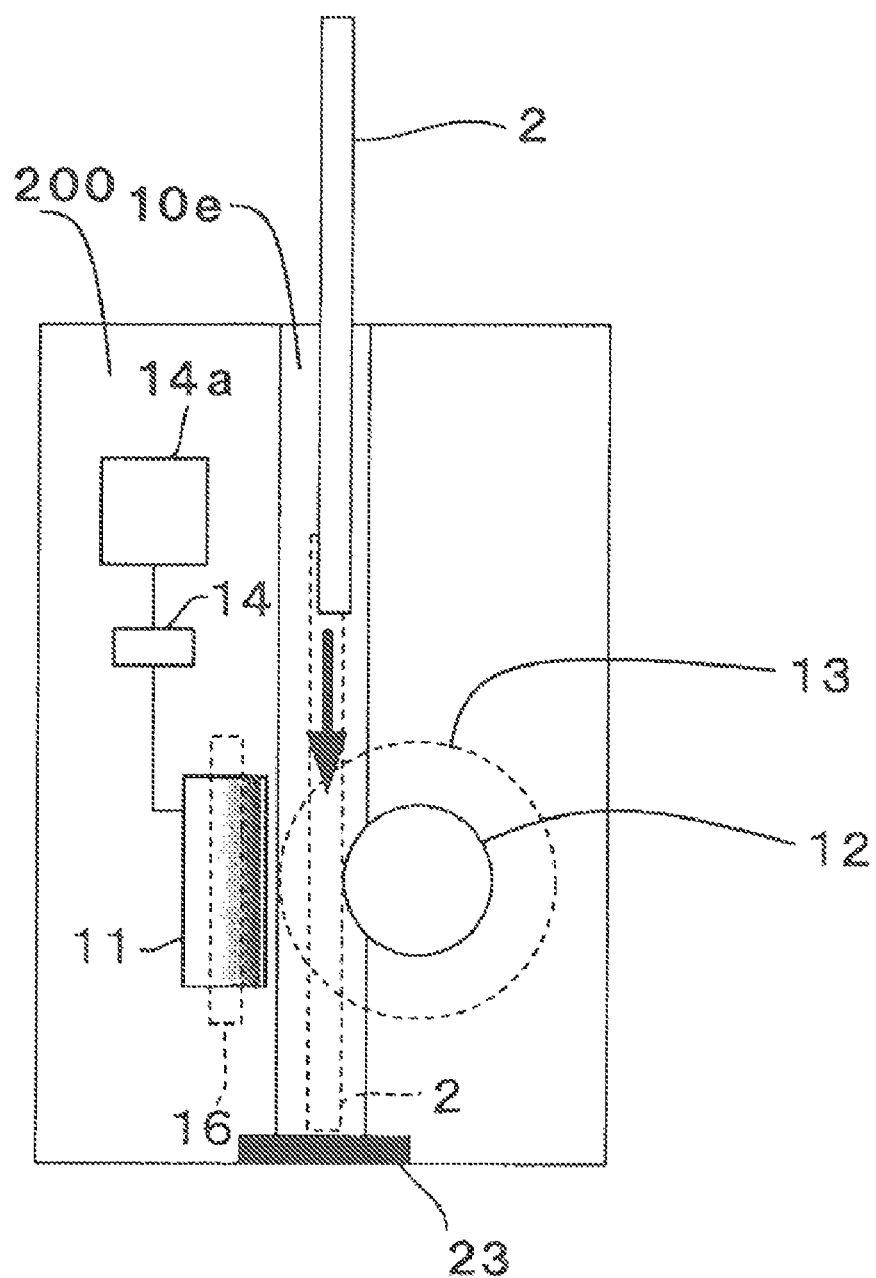
FIG. 11 is a schematic drawing to show a condition in which an RF antenna is placed so as to surround the image sensor.

FIG. 11 is a schematic drawing to show a condition in which the RF antenna 16 is placed so as to surround the image sensor 11. The swiping-type information reading apparatus 200 shown in FIG. 11 is still shorter in a transfer direction than the swiping-type information reading apparatus 200 shown in FIG. 10. When the RF antenna 16 is placed so as to surround the image sensor 11 according to a concept of implementation of both reading optical information and reading electromagnetic information together as described above, a significantly compact design in comparison with a conventional design can be materialized.

Figure 12:
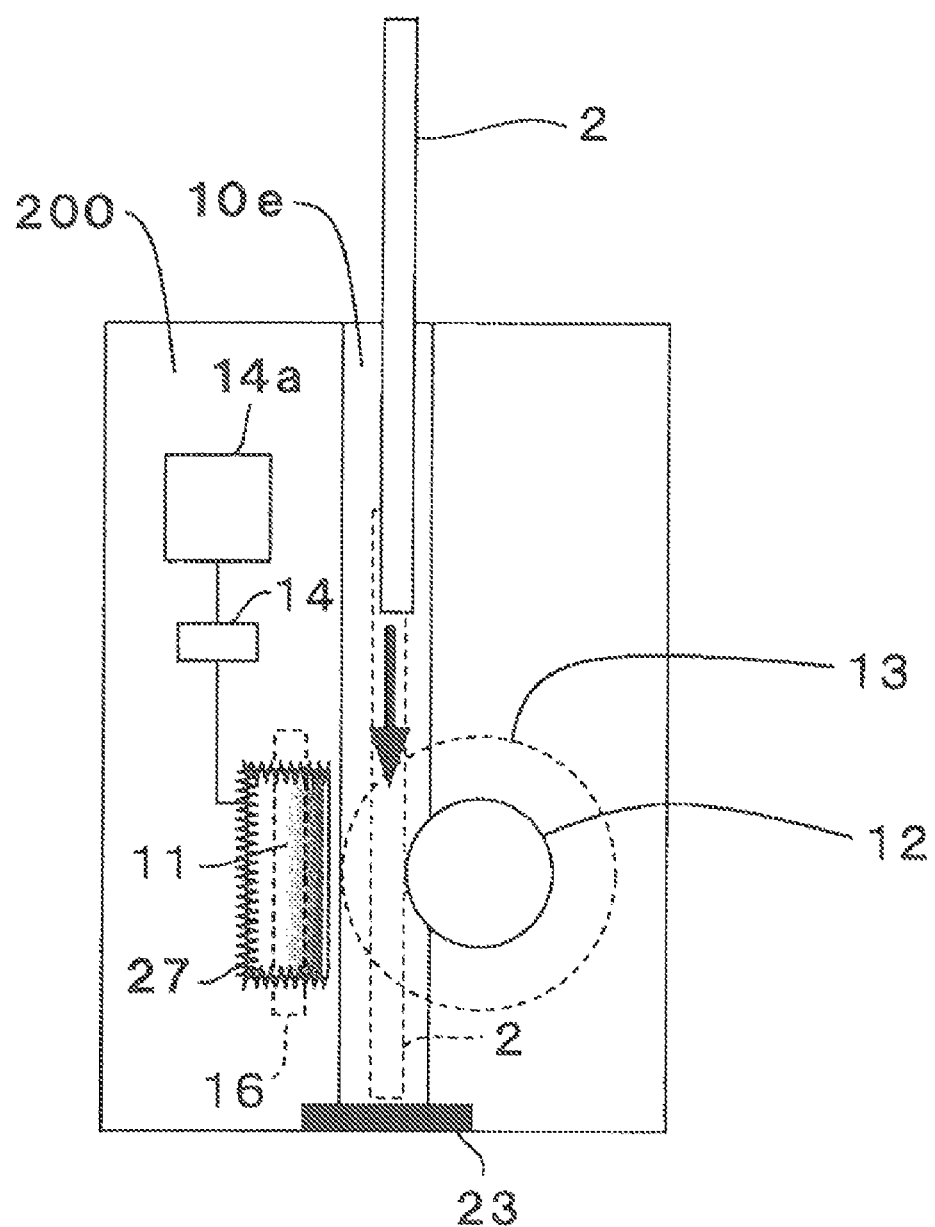
FIG. 12 is a schematic drawing to show a condition in which the image sensor is covered with a copper foil.

FIG. 12 is a schematic drawing to show a condition in which the image sensor 11 is covered with a copper foil 27. When a compact design is materialized as explained with reference to FIG. 10 and FIG. 11, an electromagnetic wave used for sending and receiving information between the antenna coil 34 embedded in an information recording medium and the RF antenna 16 sometimes collides with (or, passes through) the image sensor 11. Even in such a case, according to this arrangement, such a bad influence (for example, a noise placed on image data captured by the image sensor 11, and so on) can be avoided.

Third Embodiment

Described below with reference to FIG. 13 through FIG. 18, as a preferred embodiment of the present invention, is a third embodiment (hereinafter, to be called "the embodiment No. 3"), in which a phase of a clock signal to be supplied to the image processing section 14 and a phase of a clock signal to be supplied to the RF communication section 15 in the case of the embodiment No. 1 described above are synchronized in an information reading apparatus.

Figure 13:
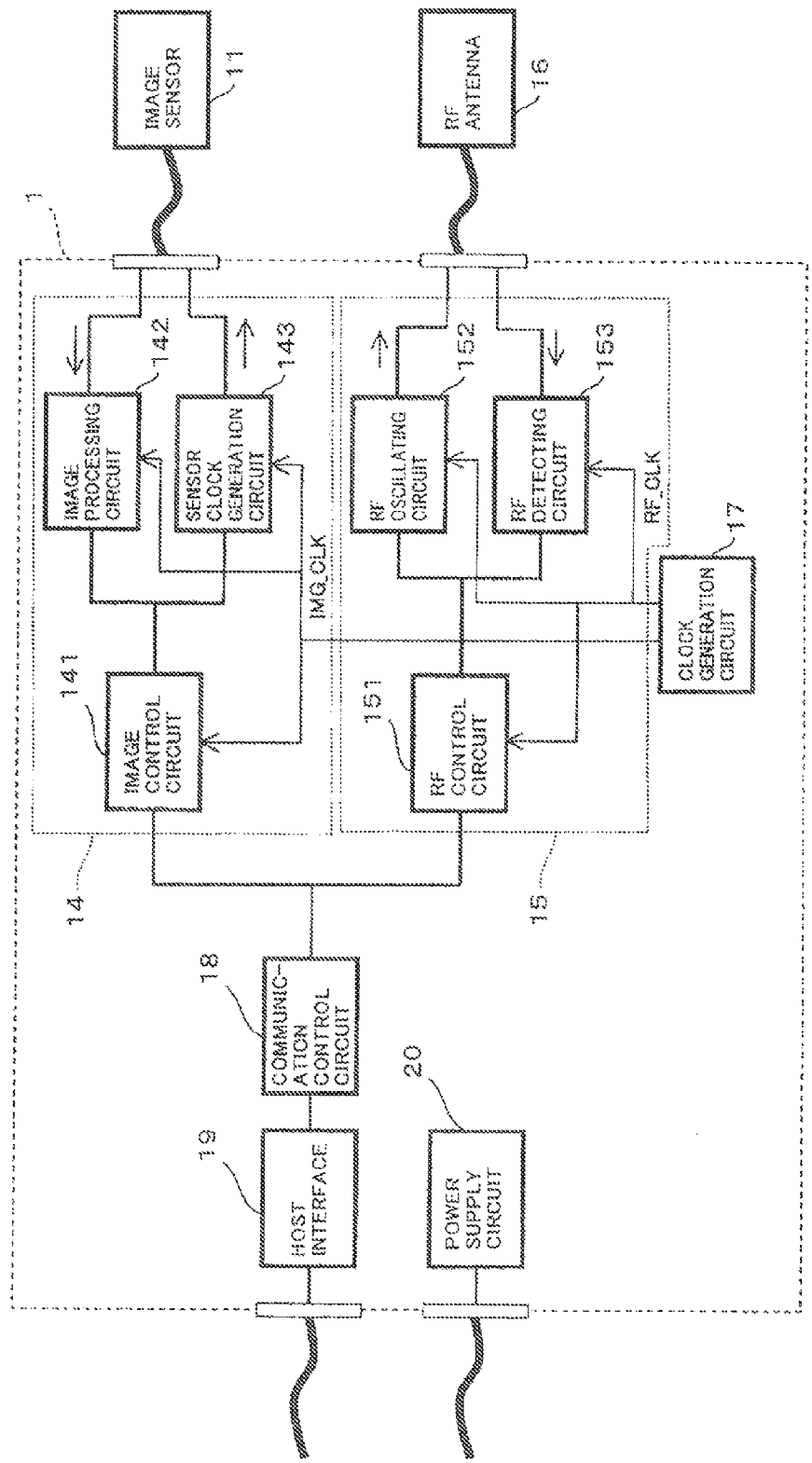
FIG. 13 is a block diagram to show a detailed electrical structure of a swiping-type information processing apparatus relating to an embodiment No. 3 of the present invention.

Electrical Structure of the Embodiment No. 3:

FIG. 13 is a block diagram to show a detailed electrical structure of the swiping-type information processing apparatus 200 relating to an embodiment No. 3 of the present invention.

In FIG. 13, the swiping-type information processing apparatus 200 includes: the image processing section 14, the RF communication section 15, the clock generation circuit 17, the communication control circuit 18, the host interface 19, and the power supply circuit 20. Incidentally, indication of commonplace electronic elements such as a CPU, a ROM, a RAM, and so on is omitted on the drawing.

The image sensor 11 is connected to the image processing section 14, as described above, and meanwhile an RF antenna 16 is connected to the RF communication section 15, as described above. Furthermore, both the image processing section 14 and the RF communication section 15 are connected to the host interface 19 through the communication control circuit 18, and then the host interface 19 is connected to, for example, an upper system such as an ATM machine of a bank (not illustrated). Moreover, the power supply circuit 20 of the swiping-type information processing apparatus 200 supplies each section with electric power by using electric power sent from the upper system.

The image processing section 14 is connected to the communication control circuit 18, and the image processing section 14 includes: the image control circuit 141 which extensively controls the image processing section 14, the image processing circuit 142 which carries out various processes for image data sent from the image sensor 11, the sensor clock generation circuit 143 which generates a sensor clock required for driving the image sensor 11.

In the meantime, the RF communication section 15 is connected to the communication control circuit 18, and the RF communication section 15 includes: the RF control circuit 151 which extensively controls the RF communication section 15, the RF oscillating circuit 152 which sends a predefined signal placed on a carrier wave to the RF antenna 16, and the RF detecting circuit 153 which extracts the predefined signal from data (to detect the signal by removing the carrier wave) sent from the RF antenna 16.

On this occasion, an electrical signal that operates the image processing section 14 including the image control circuit 141, the image processing circuit 142, and the sensor clock generation circuit 143; and an electrical signal that operates the RF communication section 15 including the RF control circuit 151, the RF oscillating circuit 152, and the RF detecting circuit 153 are sent from the clock generation circuit 17. That is to say, the clock generation circuit 17 has a function for driving the image processing section 14 and the RF communication section 15. As the clock generation circuit 17 having such a function, a frequency dividing circuit shown in FIG. 4 and a frequency multiplying circuit shown in FIG. 5 can be quoted for example.

Figure 14:
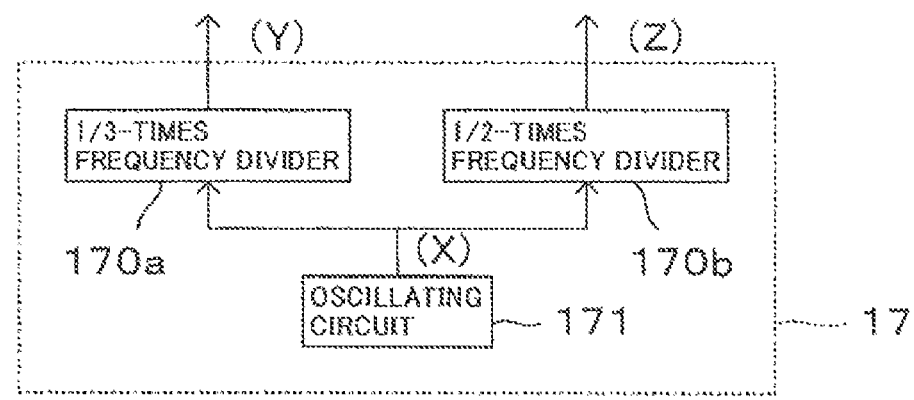
FIG. 14 includes drawings to show an example of an electrical structure of a clock generation circuit equipped with a frequency dividing function.
Figure 14:
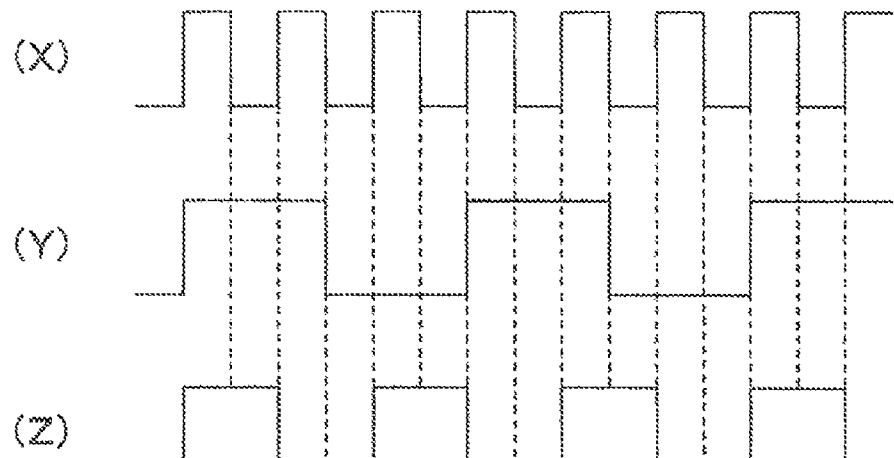
Figure 15:
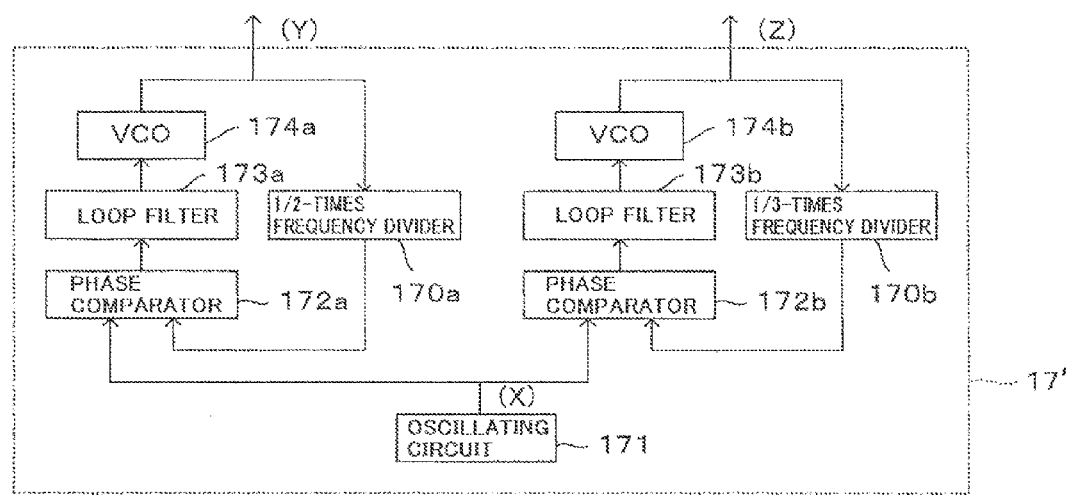
FIG. 15 includes drawings to show an example of an electrical structure of a clock generation circuit equipped with a frequency multiplying function.
Figure 15:
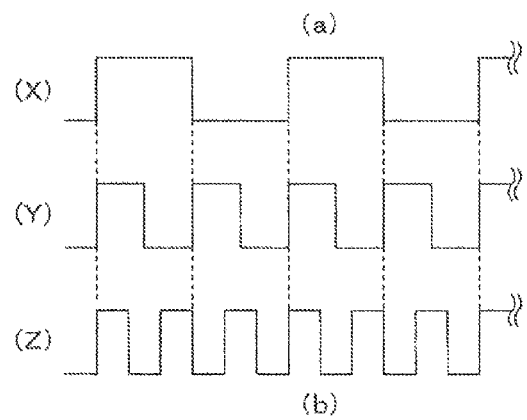

FIG. 14 includes drawings to show an example of an electrical structure of the clock generation circuit 17 equipped with a frequency dividing function. FIG. 15 includes drawings to show an example of an electrical structure of a clock generation circuit 17' equipped with a frequency multiplying function.

In FIG. 14A, the clock generation circuit 17 equipped with a frequency dividing function includes: a ⅓-times frequency divider 170a for making a frequency of an input signal ⅓ times, a ½-times frequency divider 170b for making a frequency of an input signal ½ times, and an oscillating circuit 171 for generating a clock signal for a standard (a standard signal).

In FIG. 14A, the ⅓-times frequency divider 170a has a function of making a ⅓-times frequency of the standard signal (refer to a waveform (X) of FIG. 14B) input from the oscillating circuit 171 and output the made signal (refer to a waveform (Y) of FIG. 14B). Meanwhile, the ½-times frequency divider 170b has a function of making a ½-times frequency of the standard signal (refer to a waveform (X) of FIG. 14B) input from the oscillating circuit 171 and output the made signal (refer to a waveform (Z) of FIG. 14B). As a specific example for the ⅓-times frequency divider 170a and the ½-times frequency divider 170b; a D flip-flop circuit, an RS flip-flop circuit, a JK flip-flop circuit, a JKFF flip-flop circuit, and so on can be used for example.

Thus, in the clock generation circuit 17, it is possible to pick up a signal having a ⅓-times frequency of the standard signal, which is synchronized with the standard signal (i.e., a signal with the waveform (Y) of FIG. 14B), and a signal having a ½-times frequency of the standard signal, which is synchronized with the standard signal (i.e., a signal with the waveform (Z) of FIG. 13B). Then, the former is supplied to the image control circuit 141, the image processing circuit 142, and the sensor clock generation circuit 143 individually (refer to FIG. 13), while the latter is supplied to the RF control circuit 151, the RF oscillating circuit 152, and the RF detecting circuit 153 individually (refer to FIG. 13). As a specific value, if a frequency of the standard signal supplied from the oscillating circuit 171 (a frequency of the signal of the waveform (X) of FIG. 14B) is 27.12 MHz for example, a frequency of an electric signal to be supplied to the image processing section 14 (a frequency of the signal of the waveform (Y) of FIG. 14B) is 9.04 MHz (approx. 8 MHz) and meanwhile a frequency of an electric signal to be supplied to the RF communication section 15 (a frequency of the signal of the waveform (Z) of FIG. 14B) is 13.56 MHz. Next, the clock generation circuit 17' having a frequency multiplying function that FIG. 15A shows is explained In FIG. 15A, the clock generation circuit 17' having a frequency multiplying function includes: the oscillating circuit 171 for generating a clock signal for a standard (a standard signal), phase comparators 172a and 172b each of which generates a differential signal by comparing a phase difference between two input signals, loop filters 173a and 173b each of which removes an alternative component, voltage control oscillators (VCO) 174a and 174b each of which is provided with its certain free-running frequency and able to change an oscillating frequency by impressing voltage onto an control terminal, a ½-times frequency divider 170a for making a frequency of an input signal ½ times, and a ⅓-times frequency divider 170b for making a frequency of an input signal ⅓ times.

In FIG. 15A, at first the phase comparator 172a makes a phase comparison between the standard signal input from the oscillating circuit 171 (e.g., a signal having a waveform (X) of FIG. 15B) and a comparative signal generated by free-running oscillation of the VCO 174a, and then outputs a differential phase element as a pulse-like differential phase signal. Then, the loop filter 173a (a LPF and so on) interrupts a high-frequency element of the differential phase signal. Meanwhile, the VCO 174a adjusts an oscillation frequency according to the differential phase signal, in which the high-frequency element is already interrupted, so as to feed back a signal having a certain free-running frequency to the phase comparator 172a. Incidentally, when a phase of the signal output from the VCO 174a is earlier than the standard signal, the oscillation frequency of the VCO 174a decreases (to make the phase later). Contrarily, when the phase of the signal output from the VCO 174a is later than the standard signal, the oscillation frequency of the VCO 174a increases (to make the phase earlier).

On this occasion, it is configured so that, at the time when the signal having a certain free-running frequency is fed back from the VCO 174a to the phase comparator 172a, the signal passes through the ½-times frequency divider 170a. Therefore, as a comparative signal, a signal with a ½ times frequency of that of the signal output from the VCO 174a, is input into the phase comparator 172a. As a result, an output to be picked out of the VCO 174a has a signal with a 2-times frequency of that of the standard signal and the output is a signal synchronized with the standard signal (a signal having a waveform (Y) of FIG. 15B).

The clock signal (i.e., the signal having a waveform (Y) of FIG. 15B) is supplied to the image control circuit 141, the image processing circuit 142, and the sensor clock generation circuit 143 individually (refer to FIG. 13). On the other hand, in FIG. 15A, also through a feedback group including the phase comparator 172b, the loop filter 173b, the VCO 174b, and the ⅓-times frequency divider 170b; in the same manner as described above, an output to be picked out from the VCO 170b has a signal with a 3-times frequency of that of the standard signal and the output is a signal synchronized with the standard signal (a signal having a waveform (Z) of FIG. 15B). Then, the clock signal is supplied to the RF control circuit 151, the RF oscillating circuit 152, and the RF detecting circuit 153 individually (refer to FIG. 13). As a specific value, if a frequency of the standard signal supplied from the oscillating circuit 171 (a frequency of the signal of the waveform of FIG. 15B) is 4.52 MHz for example, a frequency of an electric signal to be supplied to the image processing section 14 (a frequency of the signal of the waveform (Y) of FIG. 15B) is 9.04 MHz (approx. 8 MHz) and meanwhile a frequency of an electric signal to be supplied to the RF communication section 15 (a frequency of the signal of the waveform (Z) of FIG. 15B) is 13.56 MHz.

Thus, according to the clock generation circuit 17 or the clock generation circuit 17' shown in FIG. 14A and FIG. 15A, it is possible to carry out frequency division (refer to FIG. 14B) and frequency multiplication (refer to FIG. 15B) on the clock signal sent from the oscillating circuit 171 that works as an example of "an oscillating section" referred to below. Then, an electric signal obtained through the operation described above can be supplied to the image processing section 14 and the RF communication section 15.

Incidentally, as a specific example of the phase comparators 172a and 172b, a phase comparator of EXCLUSIVE-OR gate application type, a phase comparator of RS flip-flop application type, a phase comparator of positive edge trigger type, and so on can be used for example. Then, as a concrete example of the loop filters 173a and 173b, a lag-type LPF, a lag/lead-type LPF, and so forth can be used for example. Furthermore, as a specific example of the VCOs 174a and 174b, a quarts crystal oscillator (VCXO) and so on can be used for example.

Figure 16:
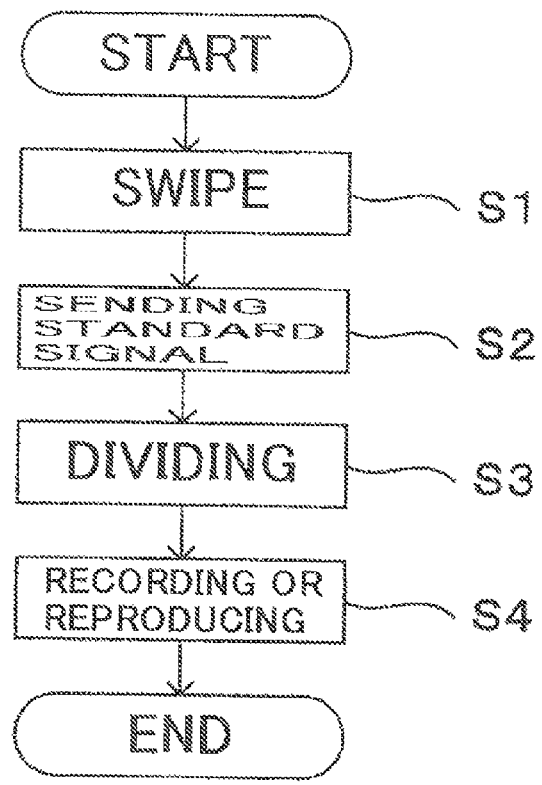
FIG. 16 is a flowchart to show operation (a flow of information processing operation) of the swiping-type information processing apparatus relating to the embodiment No. 3 of the present invention.
Figure 17:
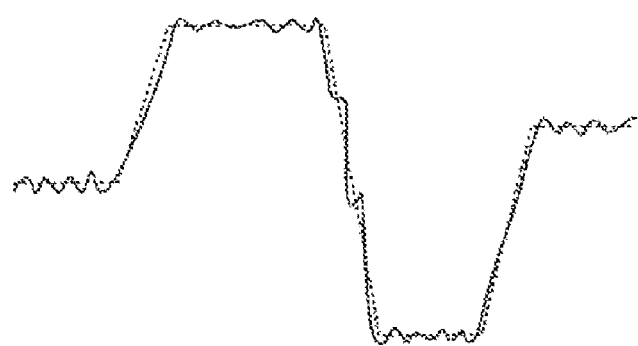
FIG. 17 includes waveform charts showing a condition in which a beat noise is placed.
Figure 17:
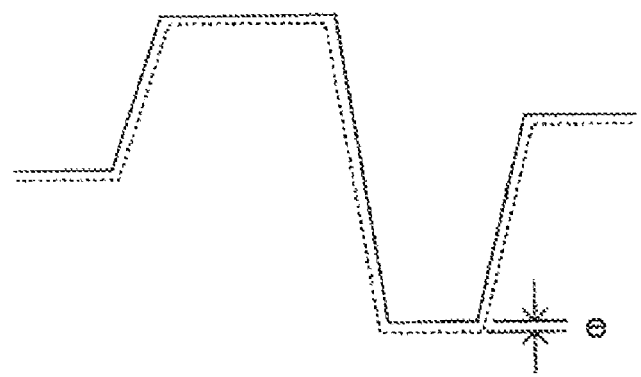
Figure 18:
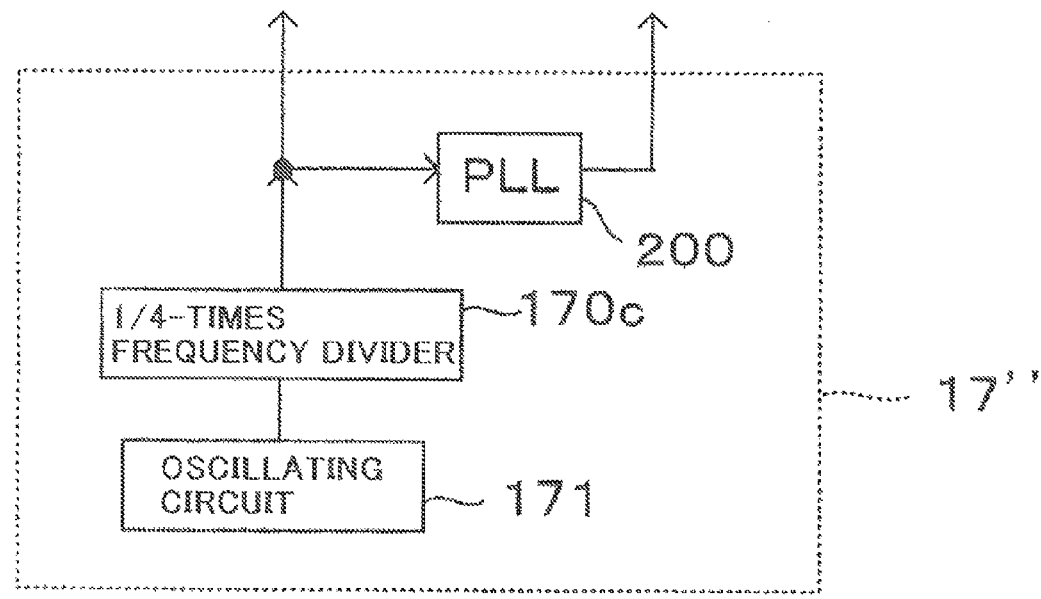
FIG. 18 is a drawing to show an example of an electrical structure of a clock generation circuit.

Information Processing Operation in the Embodiment No. 3:

FIG. 16 is a flowchart to show operation (a flow of information processing operation) of the swiping-type information processing apparatus 200 relating to the embodiment No. 3. By the way, used in this case is the clock generation circuit 17 (refer to FIG. 14).

In FIG. 16, when swiping the card 2 is carried out (Step S1), the standard signal is sent out from the clock generation circuit 17 (Step S2). More specifically, for example, when it is detected by an optical sensor and so on that the card 2 has entered the transfer path 10e, an CPU (not illustrated) of the swiping-type information processing apparatus 1 commands the oscillating circuit 171 of the clock generation circuit 17 to generate a standard signal (frequency of 27.12 MHz). Then, the standard signal is generated in the oscillating circuit 171 of the clock generation circuit 17 (refer to FIG. 14), and the standard signal is sent to the ⅓-times frequency divider 170a and the ½-times frequency divider 170a.

Subsequently, frequency division is carried out on the standard signal (Step S3). More specifically, as explained with reference to FIG. 14, the standard signal (frequency of 27.12 MHz) generated by the oscillating circuit 171 changes into an electrical signal having a ⅓-times frequency (frequency of 9.04 MHz) at the time of passing through the ⅓-times frequency divider 170a, and the changed signal is supplied to the image control circuit 141, the image processing circuit 142, and the sensor clock generation circuit 143 individually. On the other hand, the standard signal changes into an electrical signal having a ½-times frequency (frequency of 13.56 MHz) at the time of passing through the ½-times frequency divider 170b, and the changed signal is supplied to the RF control circuit 151, the RF oscillating circuit 152, and the RF detecting circuit 153 individually.

Then, recording or reproducing data is carried out (Step S4). More specifically, at first the sensor clock generation circuit 143 generates a sensor clock for driving the image sensor (an image pickup device) 11 by using the electrical signal supplied in Step S3, and supplies the generated signal to the image sensor 11. Then, the image sensor 11 captures an image of the two-dimensional barcode 31 and the facial portrait 32 (refer to FIG. 5B) of the card 2, which passes through the transfer path 10e, by means of photoelectric conversion. Then, the image processing circuit of the image processing section 14 carries out signal processing such as position detection processing, structure analysis processing, decoding processing and so on, by using the electrical signal (a transfer clock for image data) supplied in Step S3. Thus, reproducing optical data finishes.

On the other hand, the RF oscillating circuit 152 uses the electrical signal supplied in Step S3 to place a predefined signal onto a carrier wave and to send the signal to the RF antenna 16. Thus, it is possible to record data into the memory IC 33 of the card 2 through the RF antenna 16. Meanwhile, the RF detecting circuit 153 extracts a predefined signal out of data sent from the RF antenna 16 by using the electrical signal supplied in Step S3. According to this operation, data recorded in the card 2 can be reproduced.

On this occasion, in a process of Step S4, a phase of the electrical signal used in the image processing section 14 and a phase of the electrical signal used in the RF communication section 15 are synchronized. Therefore, even if an electromagnetic crosstalk occurs between the image processing section 14 and the RF communication section 15 (the RF antenna 16), what occurs is a stable noise (for example, a cyclic noise).

For example, in a case where an unstable noise (for example, a non-cyclic noise) occurs in the image processing section 14, there appears image data having a rippling waveform (i.e., a beat noise) as shown in FIG. 17A. However, in a case where a stable noise (for example, a cyclic noise) occurs in the image processing section 14, there appears a waveform in which a DC element of the image data is drifted for a certain value "e" as shown in FIG. 17B (namely, it is not a beat noise). Consequently, as far as the noise is stable as shown in FIG. 17B, it is possible to remove the noise by implementation of black correction and/or white correction (shading correction) so that deterioration of image quality can be avoided.

Furthermore, it is also possible for the swiping-type information processing apparatus 200 relating to the present embodiment to prevent deterioration of communication quality. More specifically, it can be considered that a crosstalk noise enters the RF oscillating circuit 152 and the RF detecting circuit 153 via a power supply line through which electric power is supplied from the power supply circuit 20 (refer to FIG. 13) to each section. However, modulation and demodulation in the RF oscillating circuit 152 and the RF detecting circuit 153 is implemented by phase modulation or amplitude modulation. Therefore, when a stable noise (for example, a cyclic noise) occurs as described above, a bad influence can be limited to a minimum. Accordingly, deterioration of communication quality can also be avoided.

As described above, according to the swiping-type information processing apparatus 200 relating to the present embodiment, it is possible to prevent a beat noise due to an electromagnetic interaction from occurring. As a result, deterioration of image quality and communication quality can be avoided.

By the way, in the present embodiment, when the electrical signal to be supplied individually to the image control circuit 141, the image processing circuit 142, and the sensor clock generation circuit 143 is generated in the clock generation circuit 17, the electrical signal having a ⅓-times frequency (frequency of 9.04 MHz) is generated with the standard signal (frequency of 27.12 MHz) generated by the oscillating circuit 171. However, the present invention is not limited to the embodiment. For example, an electrical signal having a ¹⁄₂₅₆-times frequency (frequency of 0.1059375 MHz) is generated with the standard signal (frequency of 27.12 MHz) generated by the oscillating circuit 171. Then, while a PLL oscillating circuit being prepared for a transfer clock of the image sensor 11 (for example, refer to FIG. 15), an electrical signal having a frequency of 8.05125 MHz may be generated by multiplying the electrical signal with a frequency of 0.1059375 MHz (by using a ¹⁄₇₆-times frequency divider). According to this arrangement, it is possible in the same manner as described above to prevent a beat noise due to an electromagnetic interaction from occurring. As a result, deterioration of image quality can be avoided.

Furthermore, it is also possible to adopt a clock generation circuit 17" including: the oscillating circuit (OSC) 171, a ¼-times frequency divider 170c, and a PLL 200. More specifically, a standard signal (frequency of 32 MHz) generated by the oscillating circuit 171 passes through the ¼-times frequency divider 170c to change into an electrical signal of 8 MHz, and then the signal is sent to the image processing section 14. On the other hand, the electrical signal with a frequency of 8 MHz passes through the PLL 200 to get multiplied into an electrical signal of 13.56 MHz, and the signal is sent to the RF communication section 15. Thus, it is also possible to synchronize the electrical signal to be used in the image processing section 14 (8 MHz) and the electrical signal to be used in the RF communication section 15 (13.56 MHz).

Furthermore, though the card 2 is assumed as a data recording medium in the present embodiment, there is no limitation to the medium and it is possible to adopt another type of medium. Still further, though a close coupling type sensor is assumed as the image sensor 11 in the present embodiment, it is also possible to apply any other compact optical model. Moreover, though a swiping-type apparatus is assumed as the information processing apparatus 1 in the present embodiment, it is also possible to apply a scanning-type model, for example, such as a flat-bed type model, and also to apply a two-dimensional sensor, and so on. Furthermore, the present invention can also be applied to a system in which a general kind of image sensor and a wireless communication circuit exist together, as well as a system in which communication by electromagnetic coupling such as a non-contact IC, etc., and a high-frequency driven display such as a liquid crystal display, a CRT, and so on exist together.

INDUSTRIAL APPLICABILITY

The information reading apparatus relating to the present invention is useful for making it possible to improve operability and workability of the apparatus.

Furthermore, the information reading apparatus relating to the present invention is useful for making it possible to implement reading optical information as well as reading electromagnetic information together by one-time operation while avoiding deterioration of operability and reading accuracy.

Moreover, the information processing apparatus for a data recording medium relating to the present invention and the information processing method are useful for making it possible to prevent a beat noise due to an electromagnetic interaction from occurring and to avoid deterioration of image quality and communication quality.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

Information reading apparatus
1a. Transfer path
Card
Frame
10a. First frame section
10b. Second frame section
10c. Third frame section
10d. Transfer basis surface
10e. Transfer path
Image sensor
Pad roller
Encoder
Image processing section
14a. Image processing means
Non-contact communication section (RF communication section)
16, and 16a through 16c. Non-contact communication antenna (RF antenna)
Clock generation circuit
Communication control circuit
Host interface
Power supply circuit
21 & 22. Antenna
Rubber plate
Lever
Button
Actuator
Copper foil
Two-dimensional barcode
Facial portrait
Non-contact IC chip (RFIC)
Antenna coil
Media processing apparatus

What is claimed is:

1. An information reading apparatus comprising:
an image sensor which optically reads information recorded in an information recording medium, where a non-contact IC chip is embedded in the information recording medium; and
a non-contact communication antenna which sends and receives information to/from an antenna embedded in the information recording medium through electromagnetic induction;
wherein, when the image sensor optically reads information recorded in the information recording medium, a key for communication with the non-contact IC chip is simultaneously created based on a result of the optically read information; and
wherein the non-contact communication antenna is provided in plural numbers.

2. The information reading apparatus according to claim 1; wherein each of any two of the non-contact communication antennas is placed on each of planes that are almost perpendicular to each other.

3. The information reading apparatus according to claim 1; wherein the information reading apparatus still further includes a means for looking up a non-contact communication antenna, with which communication can be done, among the plurality of non-contact communication antennas.

4. The information reading apparatus according to claim 3; wherein the means for looking up includes a multiplexer; and
wherein a non-contact communication antenna, with which communication can be done, is looked up by carrying out an activating operation of the non-contact communication antennas every time when the switching operation is implemented by the multiplexer.

5. The information reading apparatus according to claim 3; wherein the look-up means looks up a non-contact communication antenna, with which communication can be done, by monitoring a presence of a response from a side of the information recording medium with AM detection.

6. The information reading apparatus according to claim 3; wherein the look-up means looks up a non-contact communication antenna, with which communication can be done, by monitoring a change in load of the non-contact communication antennas.

7. The information reading apparatus according to claim 1; wherein the information reading apparatus carries out sending and receiving information to/from an upper system through a single interface.

* * * * *